US012380640B2

(12) United States Patent
Lee et al.

(10) Patent No.: US 12,380,640 B2
(45) Date of Patent: Aug. 5, 2025

(54) 3D GENERATION OF DIVERSE CATEGORIES AND SCENES

(71) Applicants: Hsin-Ying Lee, San Jose, CA (US); Jian Ren, Hermosa Beach, CA (US); Aliaksandr Siarohin, Los Angeles, CA (US); Ivan Skorokhodov, Los Angeles, CA (US); Sergey Tulyakov, Santa Monica, CA (US); Yinghao Xu, Los Angeles, CA (US)

(72) Inventors: Hsin-Ying Lee, San Jose, CA (US); Jian Ren, Hermosa Beach, CA (US); Aliaksandr Siarohin, Los Angeles, CA (US); Ivan Skorokhodov, Los Angeles, CA (US); Sergey Tulyakov, Santa Monica, CA (US); Yinghao Xu, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 279 days.

(21) Appl. No.: 18/071,821

(22) Filed: Nov. 30, 2022

(65) Prior Publication Data
US 2024/0177414 A1 May 30, 2024

(51) Int. Cl.
*G06T 17/00* (2006.01)
*G06T 7/50* (2017.01)
*G06T 7/90* (2017.01)
*G06V 10/82* (2022.01)

(52) U.S. Cl.
CPC .............. *G06T 17/00* (2013.01); *G06T 7/50* (2017.01); *G06T 7/90* (2017.01); *G06V 10/82* (2022.01); *G06T 2207/10024* (2013.01)

(58) Field of Classification Search
CPC ....... G06T 15/00; G06T 15/005; G06T 15/08; G06N 3/045; G06N 3/0455; G06N 3/0475
See application file for complete search history.

(56) References Cited

PUBLICATIONS

Chan, Eric R., et al. "Efficient geometry-aware 3d generative adversarial networks." Proceedings of the IEEE/CVF conference on computer vision and pattern recognition. 2022. (Year: 2022).*

(Continued)

*Primary Examiner* — Ryan McCulley
(74) *Attorney, Agent, or Firm* — CM Law; Stephen J. Weed

(57) ABSTRACT

A three-dimensional (3D) scene is generated from non-aligned generic camera priors by producing a tri-plane representation for an input scene received in random latent code, obtaining a camera posterior including posterior parameters representing color and density data from the random latent code and from generic camera priors without alignment assumptions, and volumetrically rendering an image of the input scene from the color and density data to provide a scene having pixel colors and depth values from an arbitrary camera viewpoint. A depth adaptor processes depth values to generate an adapted depth map that bridges domains of rendered and estimated depth maps for the image of the input scene. The adapted depth map, color data, and scene geometry information from an external dataset are provided to a discriminator for selection of a 3D representation of the input scene.

20 Claims, 16 Drawing Sheets

(56) References Cited

PUBLICATIONS

Shi, Yichun, Divyansh Aggarwal, and Anil K. Jain. "Lifting 2d stylegan for 3d-aware face generation." Proceedings of the IEEE/CVF conference on computer vision and pattern recognition. 2021. (Year: 2021).*

Zhao, Xiaoming, et al. "Generative multiplane images: Making a 2d gan 3d-aware." European conference on computer vision. Cham: Springer Nature Switzerland, 2022. (Year: 2022).*

International Search Report and Written Opinion for International Application No. PCT/US2024/081318, dated Apr. 11, 2024 (Apr. 11, 2024)—16 pages.

Ivan Skorokhodov et al.: "3D generation on ImageNet", arxiv.org, Cornell University Library, 201 Olin Library Cornell University Ithaca, NY 14853, Mar. 2, 2023 (Mar. 2, 2023).

Ivan Skorokhodov et al: "EpiGRAF: Rethinking training of 3D GANs", arxiv.org, Cornell University Library, 201 Olin Library Cornell University Ithaca, NY 14853, Jun. 21, 2022 (Jun. 21, 2022).

Miguel Angel Bautista et al: "Gaudi: A Neural Architect for Immersive 3D Scene Generation", arxiv.org, Cornell University Library, 201 Olin Library Cornell University Ithaca, NY 14853, Jul. 27, 2022 (Jul. 27, 2022).

Niemeyer Michael et al: "Campari: Camera-Aware Decomposed Generative Neural Radiance Fields", 2021 International Conference on 3D Vision (3DV), IEEE, Dec. 1, 2021 (Dec. 1, 2021), pp. 951-961.

Yin Wei et al: "Learning to Recover 3D Scene Shape from a Single Image", 2021 IEEE/CVF Conference on Computer Vision and Pattern Recognition (CVPR), IEEE, Jun. 20, 2021 (Jun. 20, 2021), pp. 204-213.

Zifan Shi et al: "Deep Generative Models on 3D Representations: A Survey", arxiv.org, Cornell University Library, 201 Olin Library Cornell University Ithaca, NY 14853, Oct. 27, 2022 (Oct. 27, 2022).

* cited by examiner

NFS: 3.64

NFS: 25.59

3D GENERATION OF DIVERSE CATEGORIES AND SCENES

TECHNICAL FIELD

Examples set forth herein generally relate to generation of three-dimensional (3D) scenes and, in particular, to methods and systems for generating 3D objects and scenes from non-aligned datasets.

BACKGROUND

In recent years, there has been progress in the domain of 3D-aware image synthesis. New methods are being developed to improve the image quality, 3D consistency and efficiency of the 3D scene generators. However, the existing frameworks are designed for well-curated and aligned datasets consisting of objects of the same category, scale and global scene structure. Such curation uses a lot of specialized 3D knowledge about the object category at hand, since one needs to infer the underlying 3D keypoints to properly crop, rotate and scale the images. This makes it infeasible to perform a similar alignment procedure for diverse, in-the-wild datasets that contain numerous image categories and could even be inherently "non-alignable," i.e., there does not exist a single (approximate) canonical position that all the objects could be transformed into. For example, it is impossible to align a landscape panorama with a spoon. Conventional 3D scene generators model the geometry in low resolution and render either flat (when trained with a default camera distribution) or repetitive "layered" (when trained with a wide camera distribution) shapes.

The idea of generating 3D objects and manipulating the viewpoint has been explored under the umbrella of learning disentangled image representations, with object pose being one of the factors of variation. Visual object networks require a volumetric dataset of object shapes to train a 3D generative adversarial network (GAN) and to generate a voxel-grid for each object category, followed by viewpoint and texture sampling. This disentanglement is explicit, as explicit 3D supervision is available at training time. A further group of encoder-decoder-based generative methods uses multi-view images as a form of explicit supervision. For example, a StyleGAN-based framework (has been developed to generate view-dependent images of the same object. To do so, an object pose from a uniform distribution is sampled and a StyleGAN2 backbone is utilized to render the object. While showing impressive initial 3D-aware synthesis results, such techniques require carefully curated single-category datasets.

Neural Radiance Fields (NeRFs) have been described for representing 3D scenes and objects. NeRFs offer a convenient way to integrate 3D bias and some NeRFs render low resolution images directly. The majority of NeRFs use a convolutional upsampler to boost image resolution while maintaining reasonable computational requirements. However, adopting an upsampler comes at a cost of decreased fidelity of geometric details, as volumetric rendering is done at a lower resolution. To obtain higher resolution geometry, EpiGRAF provides a generative method that uses a patch-based strategy to efficiently train at the desired output resolution without the need of an upsampler. NeRFs require known camera poses, obtained from multi-view stereo or structure from motion. Alternatively, camera poses may be automatically estimated or fine tuned during training. However, such systems learn the camera poses from multi-view observations and camera distributions, not from a distribution of poses while having access to sparse, single-view data of diverse object categories.

Improved convergence and fidelity of GANs has been observed when using existing, generic image-based models, a notable being StyleGAN-XL, which built a pre-trained and fixed EfficientNet followed by a couple of discriminator layers to improve training on ImageNet. However, a similar technique is not suitable for a non-aligned dataset as pre-training a generic RGB-D network on a large scale RGB-D dataset is problematic due to the lack of data. Another notable example is FreezeD, which proposes to distill discriminator features for GAN fine tuning but does not rely upon an existing model for image classification.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which.

DETAILED DESCRIPTION

Figure 1:
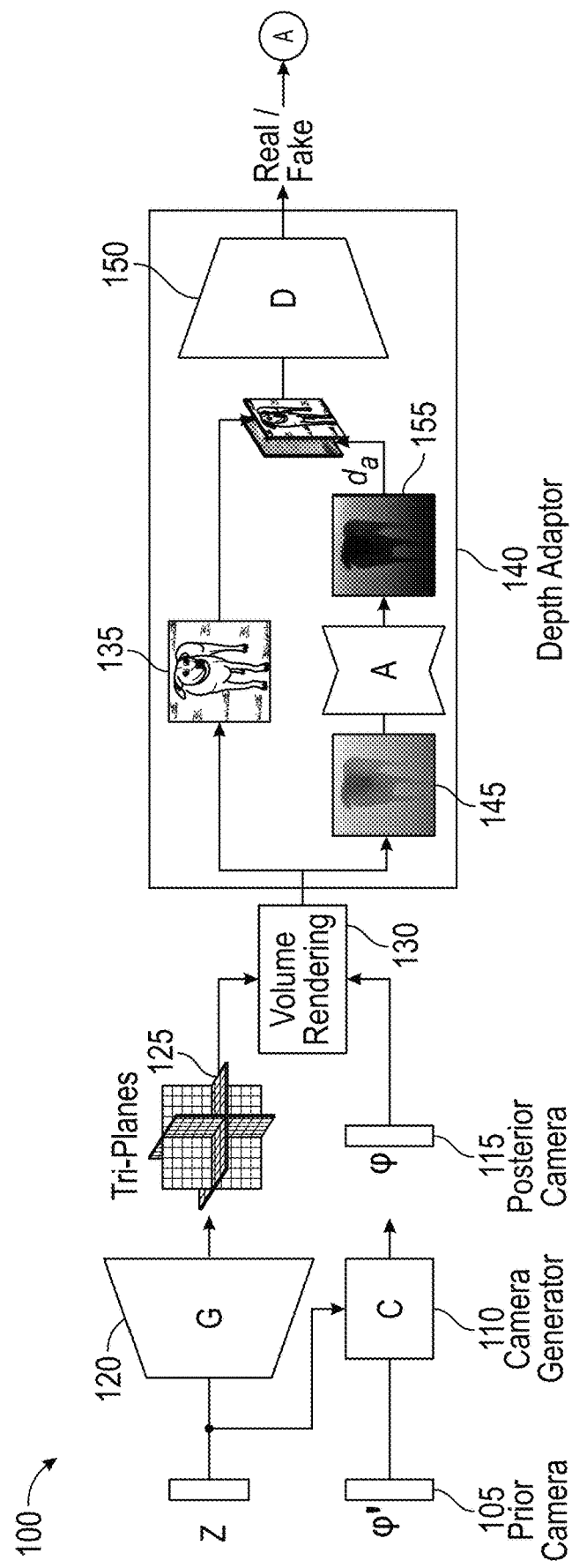
FIG. 1 is an illustration depicting an overview of the framework of a 3D generic prior system in a sample configuration.
Figure 1:
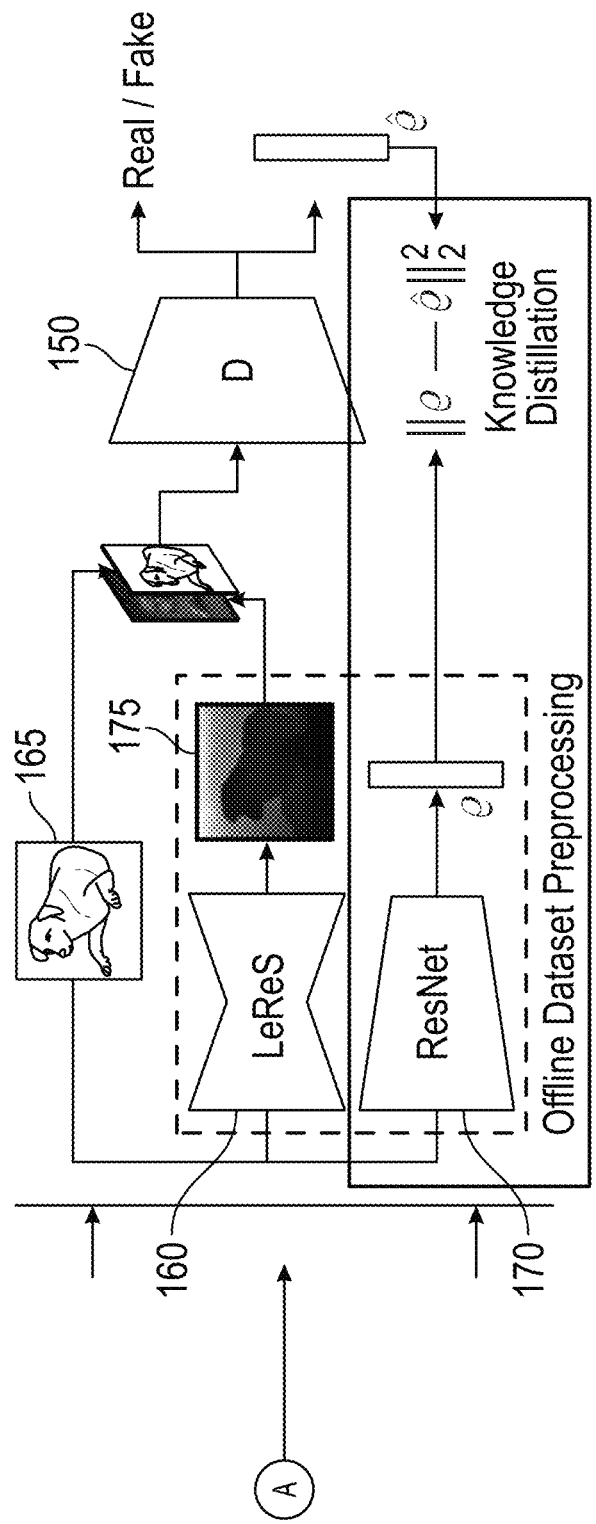

Existing 3D-from-2D generators are designed for well-curated and alignable datasets where objects can be placed in the same position and similarly scaled and oriented such that the camera always points to the center of the scene. This alignment procedure is infeasible for diverse, in-the-wild datasets as it uses expensive annotation for each object category and many images are inherently "unalignable" (i.e., there are no annotated datasets for aligning a "cat face" with a "kitchen"). As a result, existing 3D generators are not scalable to large in-the-wild datasets.

Such limitations are addressed with a three-dimensional (3D) object generator that is capable of synthesizing diverse scenes and object classes from non-aligned datasets. An off-the-shelf, imprecise depth estimator may be used to incorporate 3D inductive bias into a GAN-based generator. A learnable camera parametrization is created that does not use any alignment assumptions and a camera gradient penalty regularization is constructed. A distillation-based technique is used to transfer the knowledge from, for example, an off-the-shelf feature embedder, like ResNet50, into a discriminator.

The subject matter described herein extends 3D synthesis to in-the-wild datasets using a framework that relies on more universal 3D priors. A generator is described that is guided by imperfect depth predictions from an off-the-shelf monocular depth estimator. These 3D cues are shown to be enough to enable the generator to learn to synthesize reasonable scenes from loosely curated, non-aligned datasets, such as ImageNet. The model described herein is thus referred to as 3DGP: 3D generator with Generic Priors.

The 3DGP systems and methods described herein address several problems in the art. For example, training a 3D generator on non-aligned datasets comes with three main problems: 1) inferring true camera parameters for the real images, which are needed to define a proper camera distribution for the generator; 2) objects appear in different shapes and scales, thus making it difficult to learn meaningful 3D geometry; and 3) the dataset typically contains a lot of variation in terms of texture and structure, which makes it challenging to fit even for 2D generators. The 3DGP systems and methods described herein address these problems and extend 3D synthesis to diverse non-aligned datasets.

The present disclosure provides methods to generate a three-dimensional (3D) object or scene from non-aligned generic camera priors by producing a tri-plane representation for an input scene received in random latent code, obtaining a camera posterior including posterior parameters representing color and density data from the random latent code and from generic camera priors without alignment assumptions, and volumetrically rendering an image of the input scene from the color and density data to provide a scene having pixel colors and depth values from an arbitrary camera viewpoint. A depth adaptor processes depth values to generate an adapted depth map that bridges domains of rendered and estimated depth maps for the image of the input scene. The adapted depth map, color data, and external scene geometry information from an external dataset are provided to a discriminator for selection of a 3D representation of the input scene.

A system for implementing the method includes a 3D scene generator that produces a tri-plane representation for an input scene received in random latent code, a camera generator that obtains a camera posterior including posterior parameters representing color and density data from the random latent code and from generic camera priors without alignment assumptions of the generic camera priors, a volume renderer that volumetrically renders an image of the input scene from the color and density data to provide a scene having pixel colors and depth values from an arbitrary camera viewpoint, a depth adaptor that processes the depth values to generate an adapted depth map that bridges domains of rendered and estimated depth maps for the image of the input scene, and a discriminator that receives the adapted depth map, color data and external scene geometry information from an external dataset and selects a 3D representation of the input scene based on the color data, adapted depth map, and external scene geometry information.

A detailed description of the methodology for providing 3D synthesis to diverse non-aligned datasets will now be described with reference to FIGS. 1-9. Although this description provides a detailed description of possible implementations, it should be noted that these details are intended to be exemplary and in no way delimit the scope of the inventive subject matter.

The 3DGP systems and methods include three main features to address the noted problems when training a 3D generator on non-aligned datasets.

In accordance with a first feature, a learnable "Ball-in-Sphere" camera distribution is provided. Most existing 3D generation methods utilize a restricted camera model whereby the camera is positioned on a sphere with a constant radius and always points to the world center and has fixed intrinsics. Diverse, non-aligned datasets violate those assumptions. For example, datasets of dogs include images of both close-up snout photos and full-body dogs, which implies the variability in the focal length and look-at positions. A ball-in-sphere approach provides a learnable camera model with 6 degrees of freedom and models the camera position on a fixed-radius sphere with the field-of-view and the look-at position inside a fixed-radius ball. Also, as learning a camera distribution on complex datasets is prone to collapsing into delta distribution, an efficient gradient penalty for the camera generator is described to prevent such collapse.

A generic image dataset features a wide diversity of objects with different shapes and poses. That is why learning a meaningful 3D geometry together with the camera distribution is an ill-posed problem, as the incorrect scale can be well compensated by an incorrect camera model. In accordance with a second feature, adversarial depth supervision (ADS) is provided to instill the 3D bias. The discriminator information about the scene geometry is provided by concatenating the depth map of a scene as the 4-th channel of its RGB input. For the real images, the imperfect estimates from an off-the-shelf monocular depth predictor are used. For the fake images, the depth from the synthesized radiance field is rendered and processed with a shallow depth adaptor, bridging the distribution gap between the estimated and rendered depth maps. It is noted that existing depth estimators generalize to a wide range of scenes, making 3DGP applicable to real-world datasets.

The benefits from transferring the knowledge from conventional 2D image encoders into a synthesis model have been shown in the prior art. The state-of-the-art techniques utilize pretrained image classifiers as the discriminator backbone and develop regularization strategies on top of them. However, these techniques are only applicable when the discriminator has a similar input distribution compared to what the encoder was trained on. This makes it difficult to use efficient patch-based discriminators or passing depth maps as the 4th channel to the discriminator. Accordingly, in accordance with a third feature, a more general and more efficient knowledge transfer strategy for a discriminator based on knowledge distillation is provided. The knowledge transfer strategy includes forcing the discriminator to predict features of a pre-trained ResNet50 model, effectively transferring the knowledge into the model described herein. The described technique has just 1% of computational overhead compared to standard training, but allows improvement in Fréchet Inception Distance (FID) for both 2D and 3D generators by at least 40%.

To highlight the advantages of the 3DGP technique, the system is trained on non-aligned single-category image datasets to show that the framework can generate images of different scale. It can zoom-in into a specific region of the scene and is able to, for example, generate animal faces as well as their bodies. The 3D generator has been trained on all the 1,000 classes of ImageNet to demonstrate that multi-categorical 3D synthesis is possible on non-aligned data.

FIG. 1 is a diagram illustrating an overview of the framework of the 3DGP system 100 in a sample configuration. As illustrated, the framework of the 3DGP system 100 uses a tri-plane representation. To render an image, camera parameters φ' are sampled from the camera prior 105 and passed with random data z from a Gaussian distribution to the camera generator 110 to obtain the camera posterior 115 including posterior parameters φ. A generator 120 (e.g., an EpiGraph generator) also receives the random data z from a Gaussian distribution and generates a 3D tri-plane representation 125 of a scene. The image 135 and the corresponding depth 145 are then rendered from the posterior parameters φ and tri-plane representation 125 by the volume renderer 130. A depth adapter 140 reduces the gap between the rendered and the predicted depth in image 155 and provides a real/fake estimate using discriminator 150. The discriminator 150 receives a 4-channel color-depth pair as an input. The generated sample includes the rendered image 135 and the adapted depth $d_a$ in image 155. The real sample consists of a real image 135 and its estimated depth. The discriminator 150 has two outputs including the adversarial head and the knowledge distillation head.

In a sample configuration, the generator 120 includes a mapping network, a synthesis network, and a tri-plane decoder. The mapping network takes noise $z \in \mathbb{R}^{512}$ and class label $c \in 0, \ldots, K-1$, where K is the number of classes, and produces the style code $w \in \mathbb{R}^{512}$. In sample configurations, the mapping network is a 2-layer multi-layer perceptron (MLP) network with Leaky rectified linear unit (Leaky-ReLU) activations and 512 neurons in each layer. In sample configurations, the synthesis network is a decoder network like Style-GAN2 except that it produces tri-plane features $p=(p^{xy}, p^{yz}, p^{xz}) \in \mathbb{R}^{3 \times (512 \times 512 \times 32)}$. A feature vector $f_{xyz} \in \mathbb{R}^{32}$ located $(x, y, z) \in \mathbb{R}^3$ is computed by projecting the coordinate back to the tri-plane representation, followed by bi-linearly interpolating the nearby features and averaging the features from different planes. Finally, following EpiGRAF, the tri-plane decoder in a sample configuration is a two-layer MLP network with Leaky-ReLU activations and 64 neurons in the hidden layer that takes a tri-plane feature for as input and produces the color and density (RGB, σ) in that point. The volume renderer 130 may use the same procedure as EpiGRAF.

Camera generator 110 may include linear layers with SoftPlus activations. The camera generator 110 includes a learning system to adjust the learnable posterior camera parameters to avoid posterior collapse by, for example, reducing the Lipschitz constant for the camera generator 110. As discussed further below, a Camera Gradient Penalty (Equation (1)) is introduced to regularize the camera parameters. SoftPlus activation is used instead of LeakyReLU since optimization of the Camera Gradient Penalty for non-smooth functions is unstable for small learning rates (smaller than 0.02). The learning capability enables the system to determine the location of the camera, its focal length, and the like to provide six degrees of freedom to the camera parameters for maximal flexibility in the input camera parameter data.

For the depth adaptor 140, a three layer convolutional neural network with 5×5 kernel sizes with LeakyReLU activations and 64 filters in each layer may be used. One shared convolutional layer may be used that converts 64×h×w features to the depth maps.

The same architecture for the discriminator 150 as in EpiGRAF may be used. However, the discriminator 150 additionally concatenates a 1-channel depth to the 3-channel RGB input.

Finally, a depth estimator and a feature extractor may include a pretrained LeReS 160 and ResNet50 170 networks without any modifications. A timm library may be used to extract the features such as depth data 175 for real images 165. To determine if the image is real or fake, two feature representations are obtained: e from the pretrained ResNet network 170 and ê extracted from the final representation of the discriminator 150. The loss simply pushes ê to e as described below with respect to Equation (4) to make the real/fake discrimination more difficult for discriminator 150 by distilling knowledge from the pretrained ResNet 170 into the discriminator 150.

Figure 2:
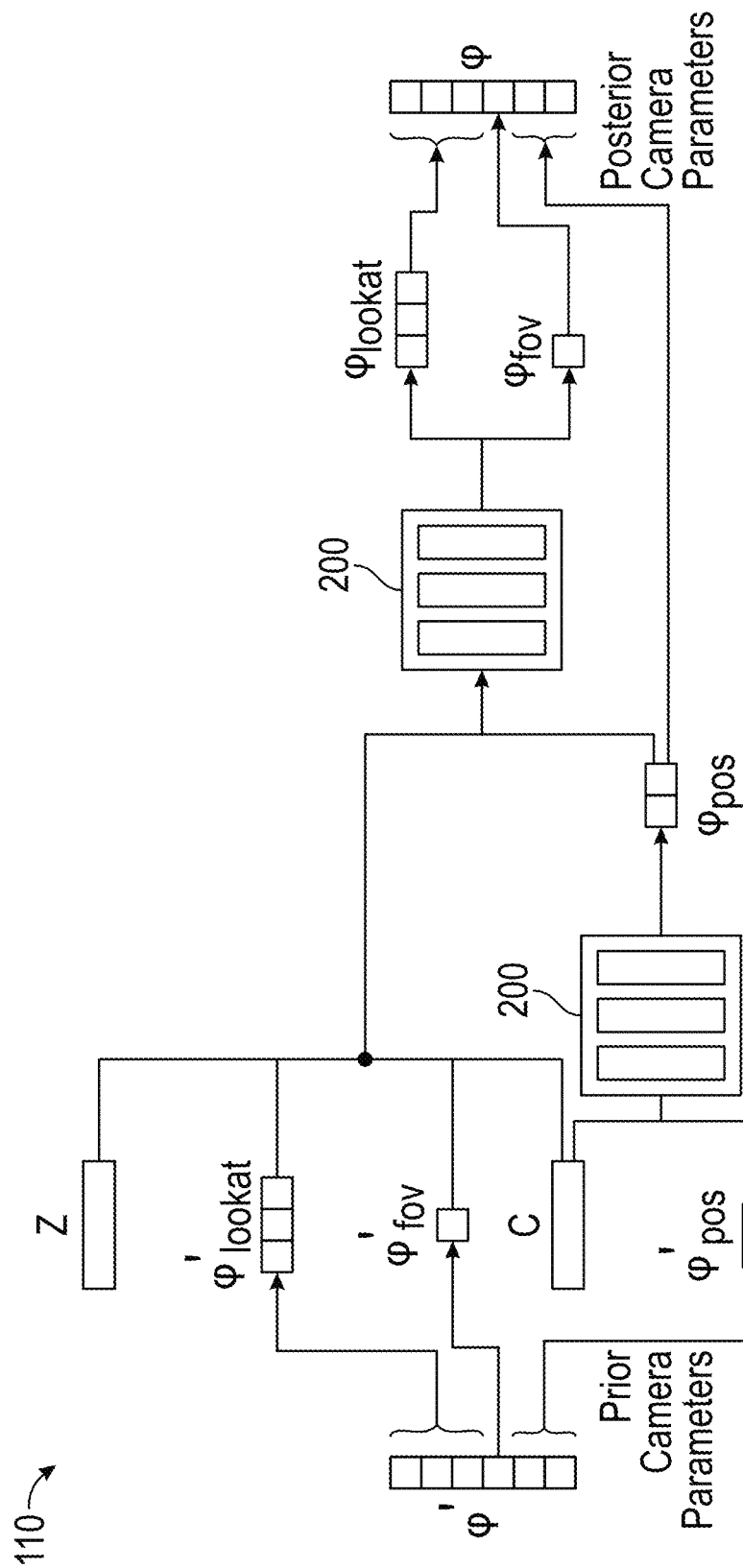
FIG. 2 is an illustration depicting a sample architecture of the camera generator of FIG. 1.

A sample architecture of the camera generator 110 is depicted in FIG. 2. As illustrated, the camera prior parameters φ' include $\varphi'_{lookat}$, $\varphi'_{fov}$, and $\varphi'_{pos}$. The camera generator 110 is conditioned on class labels c when generating the camera position φ since it might be different for different classes. The camera position is also conditioned on random data z when generating the look-at position and field-of-view since it might depend on the object shape (e.g., there is a higher probability to synthesize a close-up view of a dog's snout rather than its tail). Each MLP 200 may include 3 layers with Softplus non-linearities.

Similarly to EpiGRAF, $\lambda_r$ is set to 0.1 and $\lambda_{dist}$ is set to 1. All the models may be trained with an Adam optimizer using the learning rate of 2e-3 and $\beta_1$=0.0 and $\beta_2$=0.99. Following EpiGRAF, the model may use patch-wise training with 64×64-resolution patches and may use the β scale sampling strategy of EpiGRAF without any modifications. The batch size of 64 was used in experiments since no improvements were found when using a large batch size for the model.

Figure 3:
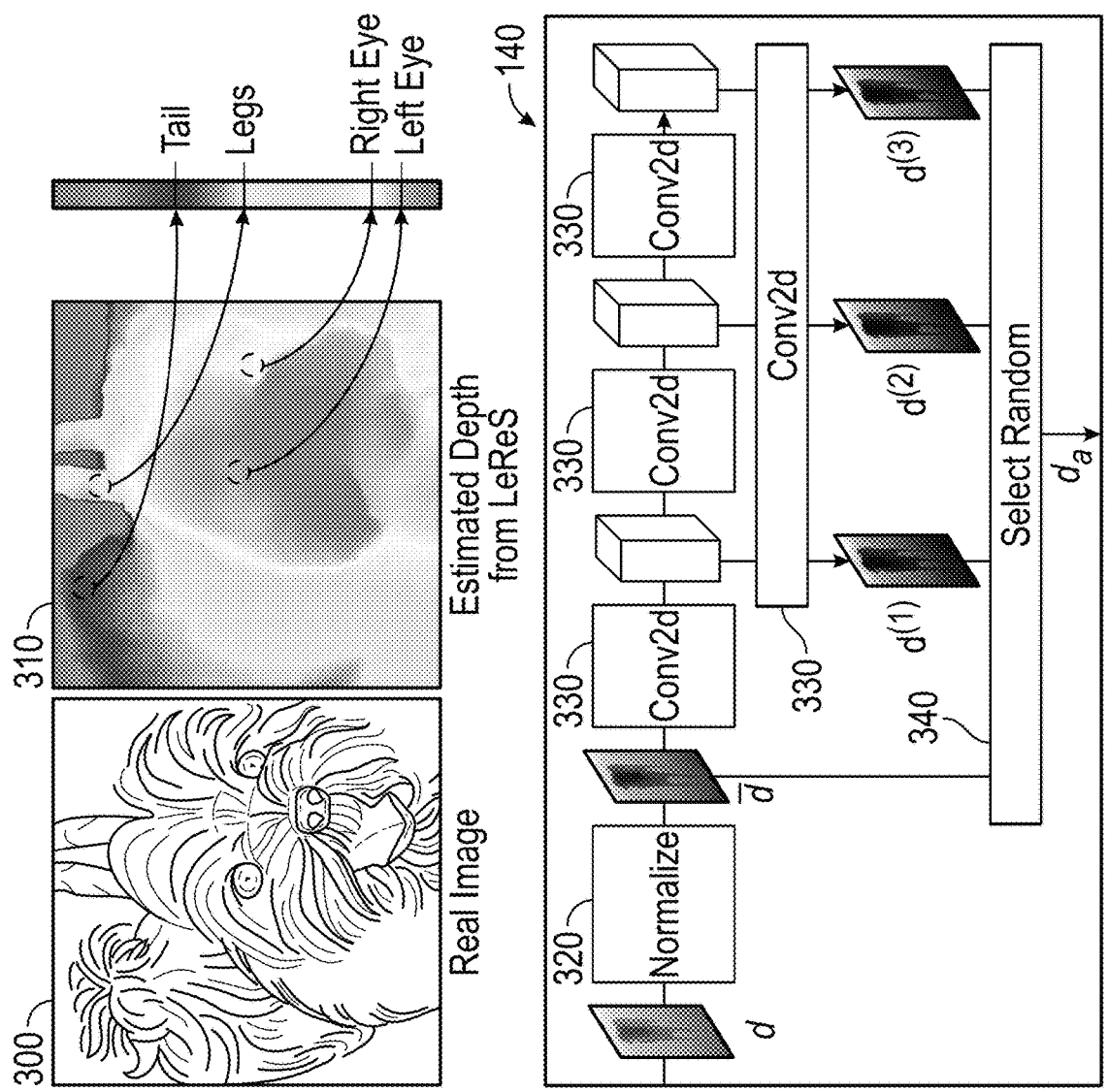
FIG. 3 is an illustration depicting a sample architecture of the depth adaptor of FIG. 1.
Figure 3:
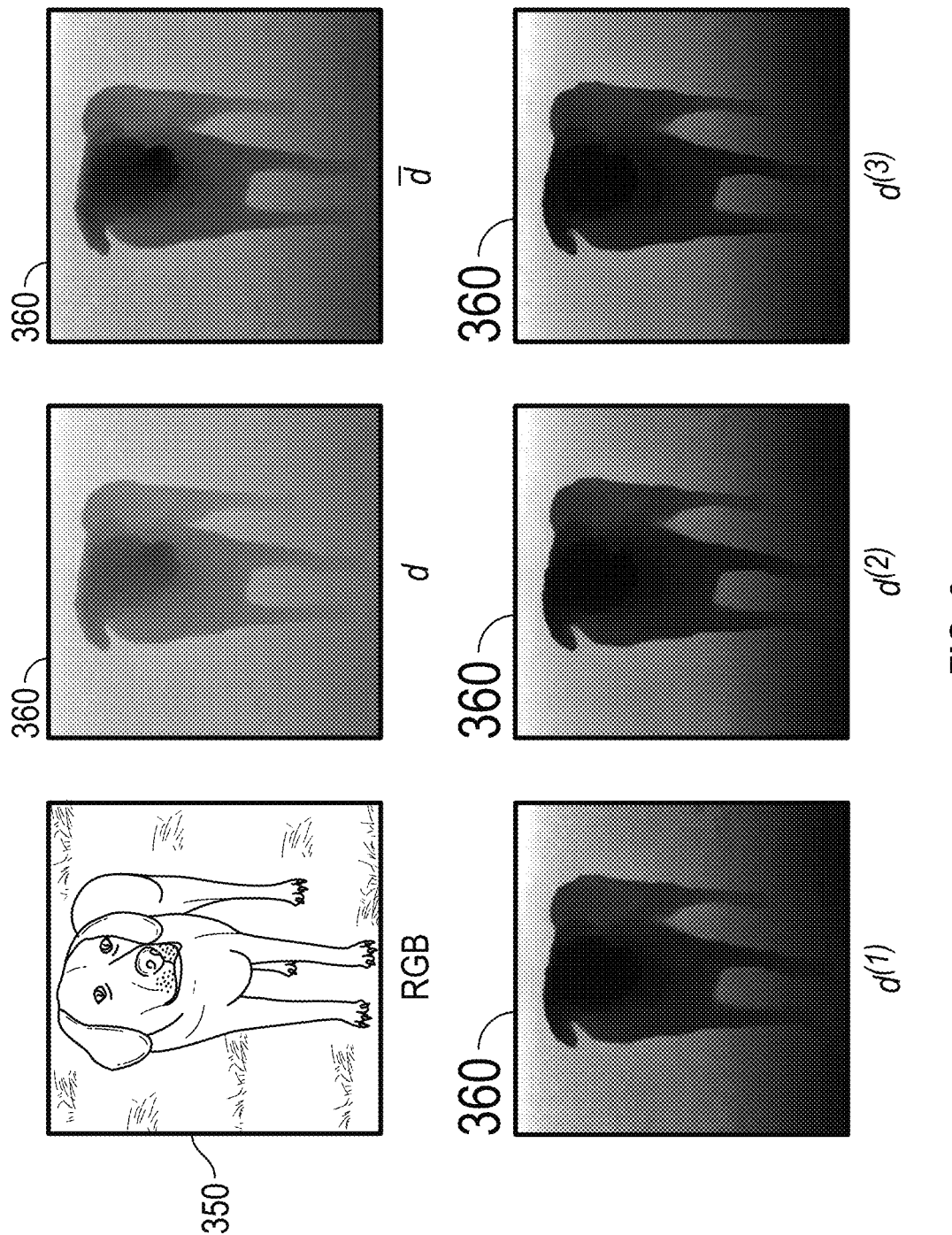

FIG. 3 illustrates a sample architecture of the depth adapter 140 of FIG. 1. As illustrated in FIG. 3, an example of a real image 300 with its depth estimated by LeReS is shown as image 310. It is noted that the estimated depth has several artifacts. For example, the human legs are closer than the tail, the eyes are spaced unrealistically, and far-away grass is predicted to be close. The depth adapter 140 bridges the domains of predicted and NeRF-rendered depth by normalizing the input depth image d with normalizer 320 and by applying the normalized image $\underline{d}$ to convolutional layers 330 including a shared convolutional layer that generates respective depth maps $d^{(1)}$, $d^{(2)}$, and $d^{(3)}$ obtained from different layers of the depth adapter 140. One of the depth maps $d^{(1)}$, $d^{(2)}$, and $d^{(3)}$ is randomly selected at 340 to provide output depth image $d_a$. The respective depth images including the RGB input image 350 of a dog and the respective generated depth images d, $\underline{d}$, $d^{(1)}$, $d^{(2)}$, and $d^{(3)}$ are shown as examples 360 on the right-hand side of FIG. 3. As described further below, the depth image is selected to provide some trade-off between geometry learning and precise adaptation.

EpiGRAF is chosen as a discriminator backbone due to its fast training speed, image quality, and multi-view consistency. An advantage of EpiGRAF compared to other methods is that it does not use a 2D upsampler. Instead, it relies on multi-scale patch-wise training to render geometry at the target resolution.

As noted above, the generator 120 architecture is similar to that of EpiGRAF. Given a random latent code z, the generator 120 produces a tri-plane representation 125 for the scene. From this representation, RGB color and density σ are obtained using a shallow 2-layer MLP decoder in the camera generator 110 (FIG. 2). Volumetric rendering by volume renderer 130 (see Equation (2) below) is used to obtain pixel colors and depth values from an arbitrary viewpoint to generate an image of an input scene without aligning the data. However, in contrast to prior systems that utilize fixed camera distribution, the camera is sampled from a learned camera generator 110. Also, as described further below, depth is rendered and processed by the depth adaptor 140 to bridge the domains of rendered and estimated depth maps. The discriminator 150 may follow the architecture of StyleGAN2 to additionally accept either adapted or estimated depth as a fourth channel. To further improve image fidelity, a knowledge distillation technique is provided that enriches the discriminator 150 with external knowledge obtained from ResNet, as further described below.

Figure 4A:
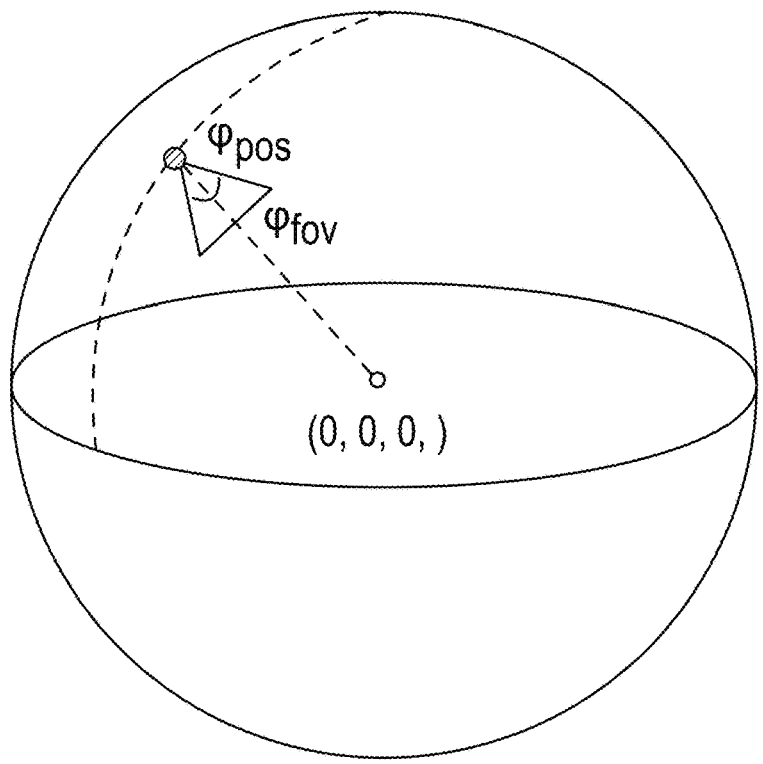
FIG. 4A is an illustration depicting a prior art representation of a camera distribution having 2 degrees of freedom where the camera is on a sphere and looks at its center.

The camera parameterization of existing 3D generators follows an overly simplified distribution in that its position is sampled on a fixed radius sphere with fixed intrinsics, whereby the camera always points to the center of the sphere (0, 0, 0). This parametrization has only two degrees of freedom: pitch and yaw ($\varphi_{pos}$ in FIG. 4A). As shown in FIG. 4A, a commonly employed camera distribution assumes the camera is on a sphere and looks at its center. This parametrization implicitly assumes that all objects could be centered, equally rotated and scaled with respect to some canonical alignment. However, 3D scenes are inherently non-alignable. For example, a scene could consist of multiple objects, such as "a cat in a kitchen". Furthermore, objects with highly articulated geometry assume significantly different shapes, rendering it impossible to establish a common camera convention for such data.

Figure 4B:
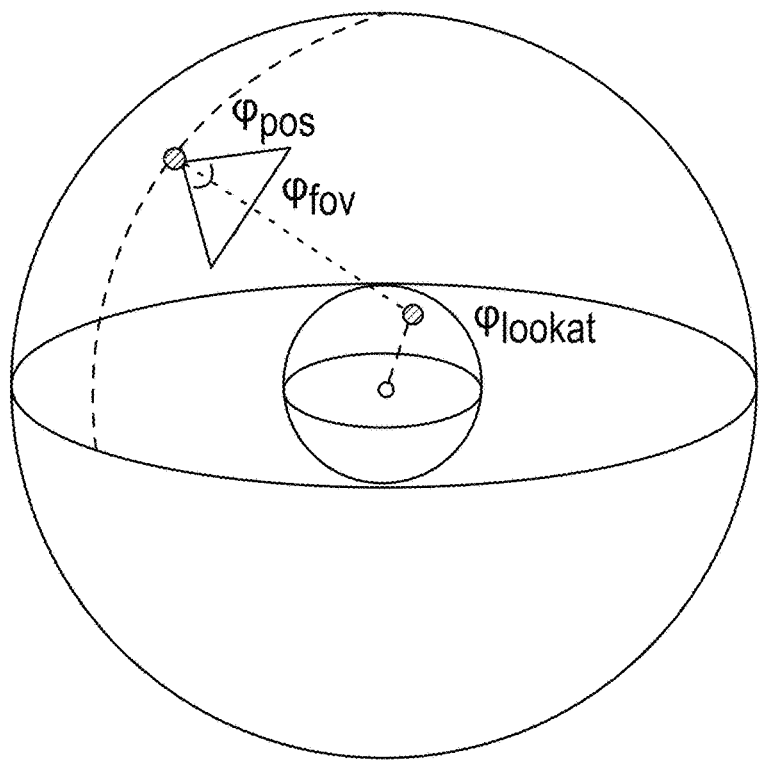
FIG. 4B is an illustration depicting a "Ball-in-Sphere" camera distribution in a sample configuration having 4 additional degrees of freedom.

The methods described herein adopt a new camera parametrization called "Ball-in-Sphere". Contrary to the standard parametrization, the Ball-in-Sphere camera parameterization has four additional degrees of freedom: the field of view $\varphi$fov and pitch, yaw and radius of the inner sphere, specifying the look-at point within the outer sphere ($\varphi$lookat in FIG. 4B), all of which are learnable parameters. Combining with the standard parameters on the outer sphere, the camera parametrization has six degrees of freedom $\varphi=[\varphi\text{pos}\|\varphi\text{fov}\|\varphi\text{lookat}]$, where $\|$ denotes concatenation. It is noted that compared with the standard camera parameterization, the Ball-in-Sphere camera parameterization allows the system to learn the scale of objects and scenes, enabling zooming into different parts of the scene as shown in FIG. 4B.

Instead of manually defining camera distributions, the camera distribution is learned during training for each dataset. In particular, the camera generator network 110 that takes camera parameters sampled from a sufficiently wide camera prior $\varphi'$ is sampled to produce new camera parameters $\varphi$. For a class conditional dataset, such as ImageNet where scenes have significantly different geometry, this network is additionally conditioned on the class label c and the latent code z, i.e. $\varphi=C(\varphi', z, c)$ (FIG. 2). For a single category dataset, $\varphi=C(\varphi', z)$ may be used.

As described below, learning a residual for each camera parameter may collapse the camera posterior distribution to a constant. To prevent the camera generator 110 from producing collapsed camera parameters, a regularization strategy is provided that is designed to prevent constant solutions, while at the same time reducing the Lipschitz constant for the camera generator 110, which has been shown to be important for stable training of generators. Both may be achieved by pushing the derivatives of the predicted camera parameters with respect to the prior camera parameters to either one or minus one, arriving at the following regularization term:

$$\mathcal{L}_{\varphi_i} = \left|\frac{\partial \varphi_i}{\partial \varphi'_i}\right| + \left|\frac{\partial \varphi_i}{\partial \varphi'_i}\right|^{-1}, \qquad \text{Equation (1)}$$

where $\varphi'_i \in \varphi'$ is the camera sampled from the prior distribution and $\varphi_i \in \varphi$ is produced by the camera generator 110. This loss is referred to herein as the Camera Gradient Penalty. It is noted that the first part of the loss prevents rapid changes in the camera, thus facilitating stable optimization, while the second part of the loss avoids collapsed camera posteriors.

To instill a 3D bias into the model, a strategy of using depth maps predicted by an off-the-shelf depth estimator is used for its advantages of being generic and readily applicable for many object categories. The main idea is concatenating the depth map as a 4th channel of the RGB as the input to the discriminator 150. The fake depth maps in this case are obtained with the help of neural rendering, while the real depth maps are estimated using a monocular depth estimator, such as pretrained LeReS 160. However, naively utilizing the depth from the monocular depth estimator may lead to training divergence. This happens because the monocular depth estimator could only produce relative depth, not metric depth. Moreover, monocular depth estimators are still not perfect as they produce noisy artifacts, ignore high-frequency details, and make prediction mistakes. Thus, a mechanism has been devised that allows utilization of the imperfect depth maps. The central part of this mechanism is a learnable depth adaptor 140, that is designed to transform and augment the depth map obtained with neural rendering to look like a depth map from the monocular depth estimator 160.

More specifically, raw depths d from NeRF are rendered via volumetric rendering by volume renderer 130 as follows:

$$d = \int_{t_n}^{t_f} T(t)\sigma(r(t))t\,dt, \qquad \text{Equation (2)}$$

where $t_n$, $t_f \in \mathbb{R}$ are near/far planes, T(t) is accumulated transmittance, and r(t) is a ray. Raw depth is shifted and scaled from the range of $[t_n, t_f]$ into $[-1, 1]$ to obtain normalized depth $\underline{d}$:

$$\underline{d} = 2 \cdot \frac{d - (t_n + t_f + b)/2}{t_f - t_n - b}, \qquad \text{Equation (3)}$$

where $b \in [0, (t_n+t_{71})/2]$ is an additional learnable shift needed to account for the empty space in the front of the camera. It is noted that depth values obtained using the monocular depth estimator span over the entire valid range of $[0, 2^{16}]$, thus empty space does not appear in them. Therefore, the depth values are mapped into the $[-1, 1]$ range to get depth $d_r$ for real input.

Although $\underline{d}$ is distributed in the same range as $d_r$, $\underline{d}$ is still not suitable for the discriminator 150. The reason is that $\underline{d}$ forces the generator 120 to learn the prediction artifacts from the depth estimator and creates an additional confusion for the generator 120, given that the depth estimator provides only relative depth. Therefore, objects in the different images with the same metric depth may still have different relative depth. To overcome this issue, the depth adaptor 140 produces an adapted depth map $d_a = A(\underline{d}) \in \mathbb{R}^{h \times w}$, where h×w is a number of sampled pixels. The depth (fake $d_a$ or real $d_r$) is concatenated with the RGB input and passed to the discriminator 150.

The depth adaptor 140 models' artifacts produced by the depth estimator so that the discriminator 150 can focus on the relevant high level geometry. However, if the depth adaptor 140 is too powerful, it could fake the depth completely, and the generator 120 will not receive any meaningful signal. To this end, the depth adaptor 140 is based on a 3-layer convolutional network as described above with respect to FIG. 3. After each layer 330, a separated depth map with different levels of adaptation is provided: $d_a^{(1)}$, $d_a^{(2)}$ and $d_a^{(3)}$. The adapted depth $d_a$ is randomly selected by random selector 340 from the set of $\{\underline{d}, d_a^{(1)}, d_a^{(2)} \text{ and } d_a^{(3)}\}$.

Such a design can effectively learn good geometry while alleviating overfitting. For example, when the generator 120 provides $\underline{d}$ to the discriminator 150, it receives a strong signal for learning the geometry. On the other hand, if the discriminator 150 sees highly adapted depth $d_a^{(3)}$, it unlikely overfits to different unrelated estimation artifacts. Finally, $d_a^{(1)}$ and $d_a^{(2)}$ provide some trade-off between geometry learning and precise adaptation. The resulting full model generates realistic high-quality views on all datasets without the flat geometry found in the prior art.

Knowledge from pretrained classification networks has been shown to improve training stability and generation quality in 2D GANs. A popular solution is to use an off-the-shelf model as a discriminator while freezing most of its weights. Unfortunately, this technique is not applicable to the scenario addressed by the present method since the architecture of the discriminator 150 is modified by adding an additional depth input and is conditioned on the parameters of the patch similarly to EpiGRAF. Thus, an alternative technique has been devised that can work with arbitrary architectures of the discriminator 150. Specifically, for each real sample, two feature representations are obtained: e from the pretrained ResNet network and ê extracted from the final representation of the discriminator 150. The loss simply pushes ê to e as follows:

$$\mathcal{L}_{dist} = \|e - \hat{e}\|_2^2. \quad \text{Equation (4)}$$

$L_{dist}$ can effectively distill knowledge from the pretrained ResNet 170 into the discriminator 150.

Overall loss for generator 120 consists of two parts: adversarial loss and Camera Gradient Penalty for each camera parameter:

$$\mathcal{L}_G = \mathcal{L}_{adv} + \sum_{\varphi_i \in \varphi} \lambda_{\varphi_i} \mathcal{L}_{\varphi_i}, \quad \text{Equation (5)}$$

where $L_{adv}$ is the non-saturating loss. A diverse distribution for camera origin is most important for learning meaningful geometry, but it is also most prone to degrade to a constant solution. Therefore, $\lambda_{\varphi_i}$ is set to 0.3 for $\varphi_{pos}$, while $\lambda_{\varphi_i}$ is set to 0.03 for $\varphi_{fov}$ and $\lambda_{\varphi_i} = 1e-3$ for $\varphi_{lookat}$.

The loss for the discriminator 150, on the other hand, consists of three parts: adversarial loss, knowledge distillation, and $R_1$ gradient penalty:

$$L_D = L_{adv} + \lambda_{dist} L_{dist} + \lambda_r R_1. \quad (6)$$

In a sample configuration, the system uses the same optimizer and hyper-parameters as EpiGRAF. For the depth adaptor 140, sampling adapted depth maps with equal probability is not always beneficial and using $P(\underline{d}) = 0.5$ has been found to lead to better geometry with less repeated geometry and flatness when the image is rotated.

Figure 5:
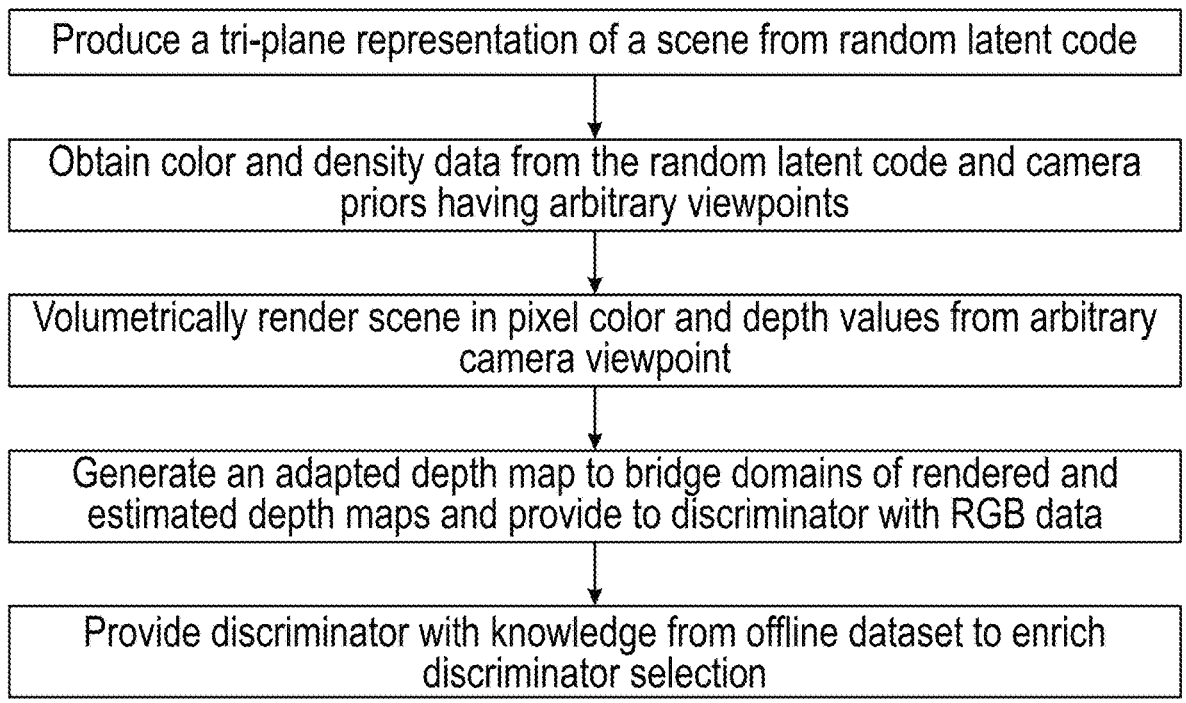
FIG. 5 is a flow chart illustrating the 3D generic prior method in a sample configuration.

FIG. 5 is a flow chart illustrating the 3DGP method 500 in a sample configuration. As illustrated, the method 500 starts at 510 by a 3D scene generator 120 producing a tri-plane representation for a scene received in random latent code z. At 520, RGB color and density σ data are obtained from the random latent code z and camera priors 105 without alignment assumptions using a shallow 2-layer MLP decoder 200 that samples arbitrary camera viewpoints captured from ball-in-sphere camera distributions provided to a camera generator 110. The RGB color and density σ are provided to a volume renderer 130 for volumetric rendering at 530 of an image of the input scene without aligning the data. The volumetric rendering results in pixel colors and depth values from an arbitrary viewpoint. The depth is rendered and processed by the depth adaptor 140 at 540 to generate an adapted depth map that bridges the domains of rendered and estimated depth maps, and the adapted depth map is provided to the discriminator 150 as a fourth channel in addition to the RGB data. At 550, a knowledge distillation technique is provided to enrich the discriminator 150 with external knowledge obtained from ResNet to make the real/fake discrimination by discriminator 150 more difficult. The resulting system learns the geometry of the scene and renders a realistic high-quality view of the input scene represented by the non-aligned scene data.

EXPERIMENTAL RESULTS

In experiments, 4 non-aligned datasets were used: Self-Distilled Internet Photos (SDIP) of Dogs, SDIP of Elephants, large-scale scene understanding (LSUN) of Horses, and ImageNet. The first three are single-category datasets that contain objects with complex articulated geometry, making them challenging for standard 3D generators. It was found to be useful to remove outlier images that may negatively affect geometry from SDIP Dogs and LSUN Horses with an instance selection technique that reduces their size to 40K samples each. The method was then validated on ImageNet, a real-world, multicategory dataset containing 1,000 diverse object classes, with more than 1,000 images per category. To train all 3D generators on ImageNet (including the baselines), the same filtering strategy was used whereby ⅓ of the images are kept. It is noted that a sample instance selection technique may first extract a 2,048-dimensional feature vector for each image then fit a multivariate Gaussian distribution on the obtained dataset and remove the images, which features have low probability density. For SDIP Dogs and LSUN Horses, a multi-variate Gaussian distribution was fitted for the whole dataset. For ImageNet, a separate model was fitted for each class with additional diagonal regularization for covariance, which is needed due to its singularity whereby a feature vector has more dimensions than the number of images in a class.

The Fréchet Inception Distance (FID) is relied on to measure the image quality and $FID_{2k}$, which is computed on 2,048 images instead of 50k (as for FID) for efficiency. For ImageNet, an Inception Score (IS) is computed. It is noted that while training is performed on the filtered ImageNet, the metrics are always computed on the full ImageNet. There is no established protocol to evaluate the geometry quality of 3D generators in general, but the state-of-the-art ones are tri-plane or message passing interface (MPI)-based. It is possible to quantify their most popular geometry failure case: flatness of the shapes. For this, a Non-Flatness Score (NFS) is proposed that is computed as the average entropy of the normalized depth maps histograms.

Figure 6:
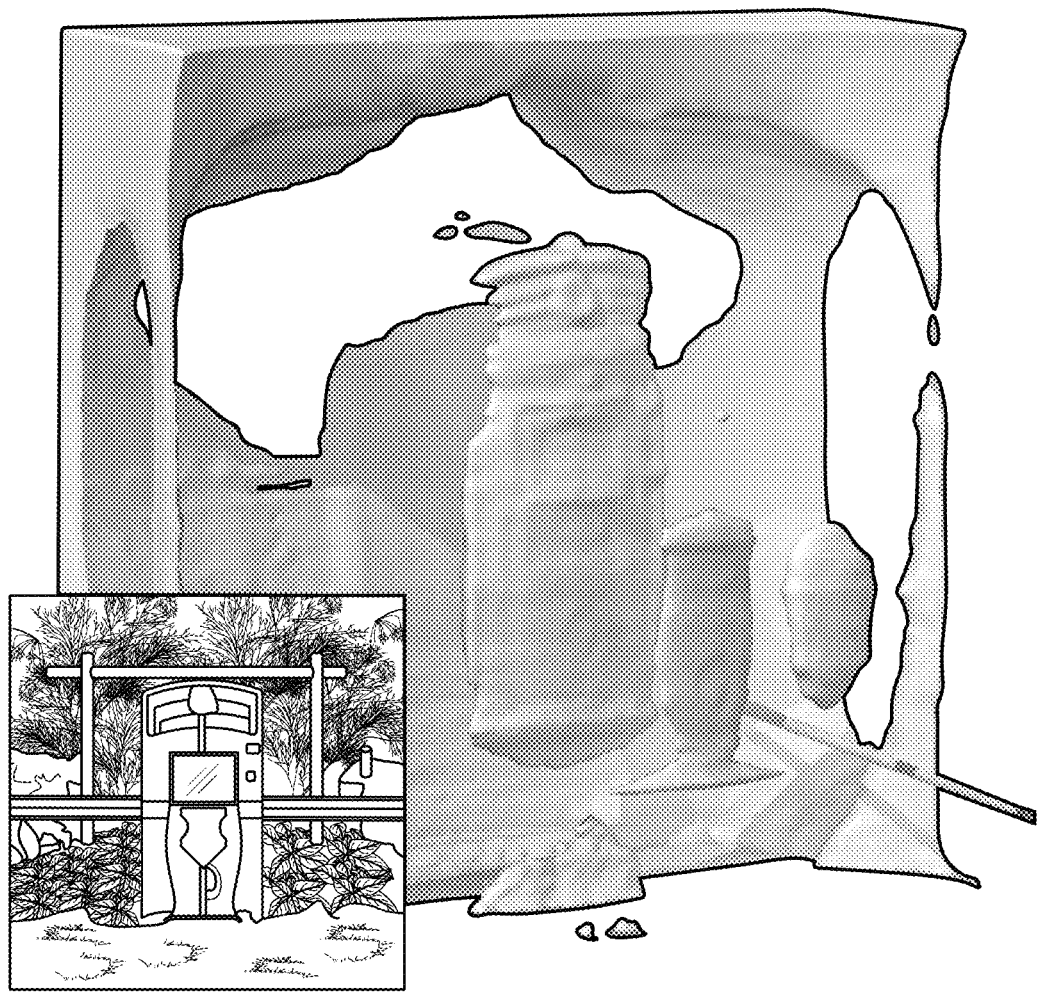
FIG. 6 illustrates three examples of repetitive geometry generated by EG3D and a more diverse generation produced by 3DGP along with their depth histograms and non-flatness scores (NFS)
Figure 6:
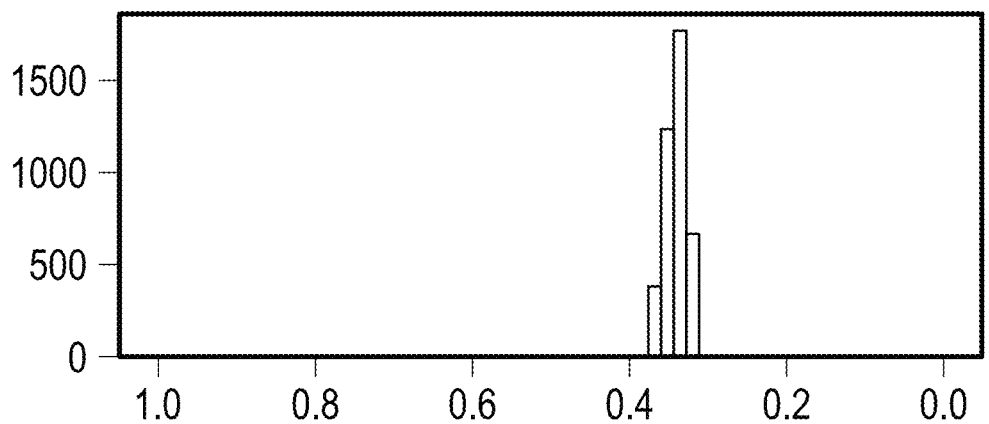
Figure 6:
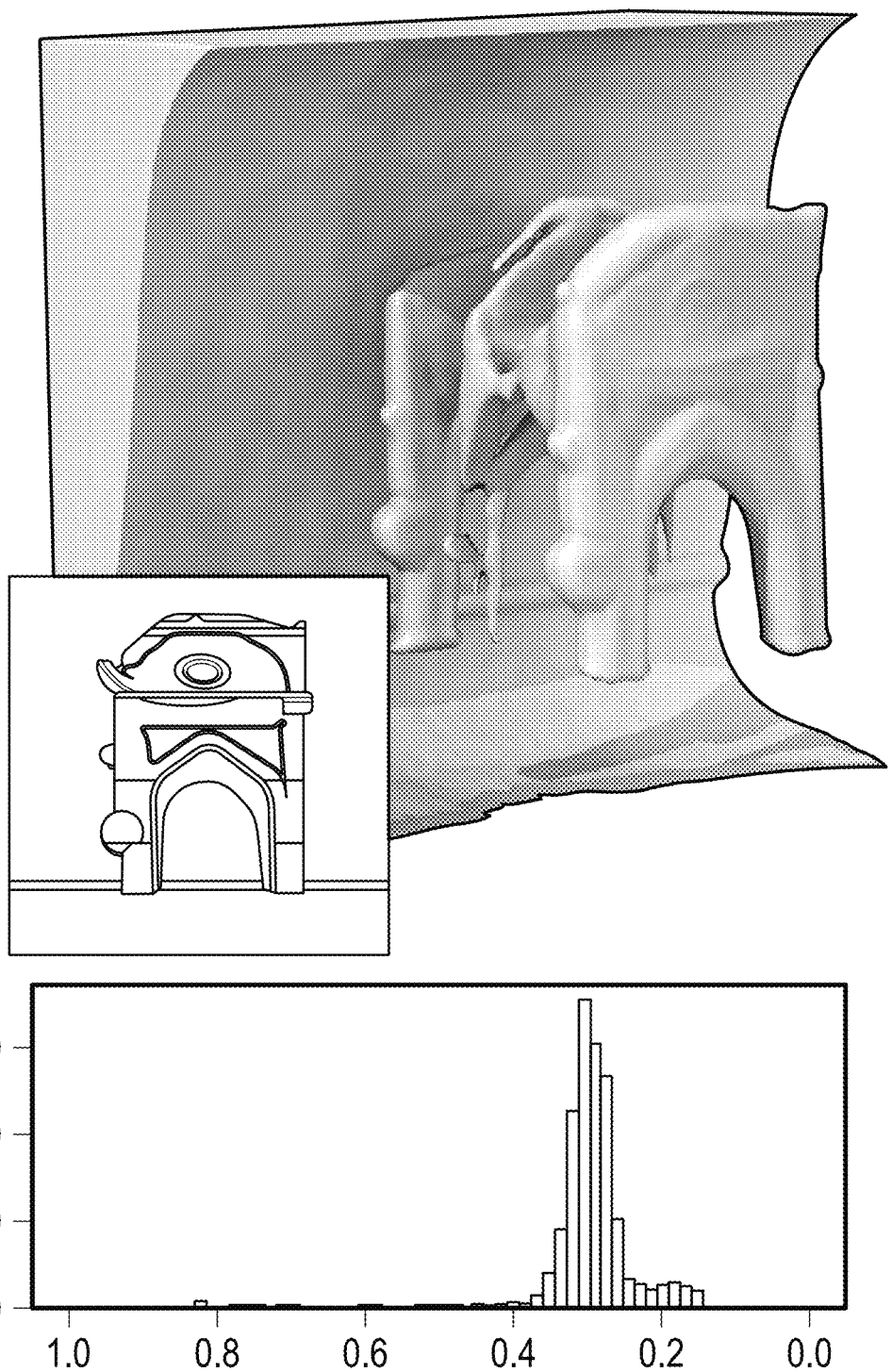
Figure 6:
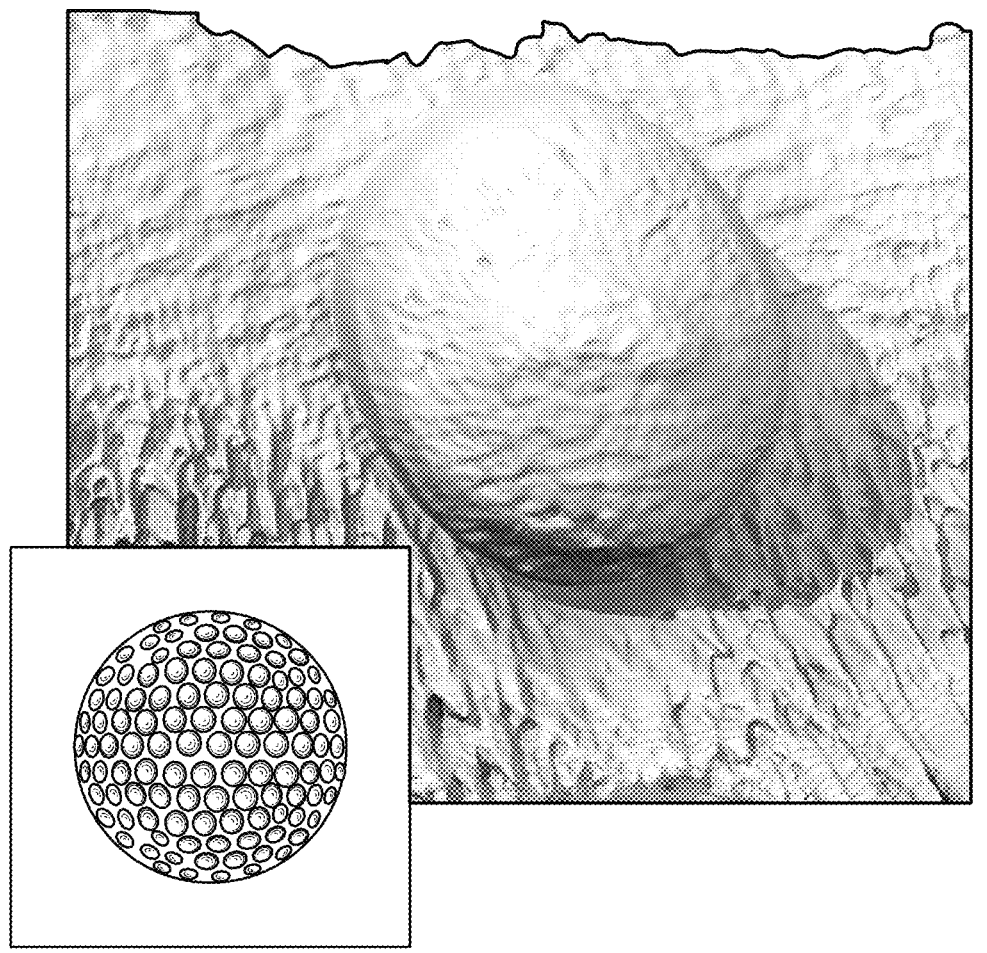
Figure 6:
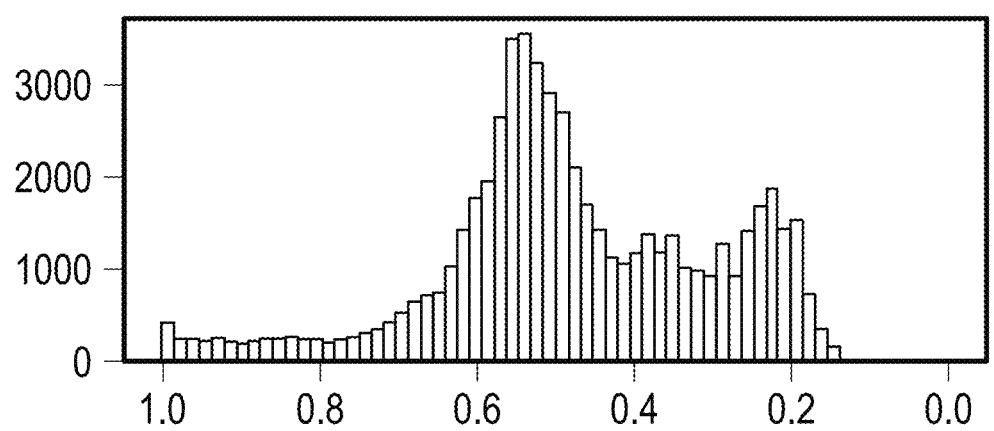

To detect and quantify the flatness of 3D generators, the NFS is computed by sampling N latent codes with their corresponding radiance fields. For each radiance field, integration is performed following Equation (2) to obtain its depth. However, the 50% of lowest density was first set to zero. This is necessary to cull spurious density artifacts. Each depth map was then normalized according to the corresponding near and far planes and a histogram was computed with B bins, showing the distribution of the depth values. To analyze how much the depth values are concentrated versus spread across the volume, the entropy was computed for each distribution. Averaging over N depth maps gives the sought score:

$$NFS = \frac{1}{N}\sum_{i=1}^{N}\exp\left[-\frac{1}{h \cdot w}\sum_{j=1}^{B}b(d^{(i)})_j\right], \quad \text{Equation (7)}$$

where $b(d^{(i)})_j$ is the normalized number of depth values in the j-th bin of the i-th depth map $d^{(i)}$, with N=256 and B=64. NFS does not directly evaluate the quality of the geometry. Instead, NFS helps to detect and quantify how flat the generated geometry is. In FIG. 6, the center and left images show examples of repetitive geometry generated by EG3D and the right-most image shows a more diverse generation produced by 3DGP. The depth histograms and corresponding NFS values (e.g., 3.64, 10.69, and 25.59) are illustrated for each image.

Table 1A below shows quantitative results for single category datasets, comparing 3DGP with EG3D and Epi-GRAF. EG3D uses the true camera poses inferred from real images as the camera distribution for the generator 110. In the present scenario, there is no knowledge about the true camera distribution, so to stay as close as possible to the setup EG3D was designed for, normal distribution was used for rotation and elevation angles with standard deviations equal to $\sigma_{yaw}=0.3$ and $\sigma_{pitch}=0.155$, respectively. Also, to make it learn better geometry, the model was trained with a twice as wide camera distribution: $\sigma_{yaw}=0.6$ and $\sigma_{pitch}=0.3$. While it indeed helped to improve the flatness of the shapes, it also considerably worsened the image quality, from 20% to 500% as measured by $FID_{2k}$. For EpiGRAF, the model could be trained only with the default camera distribution and the model was observed to diverge with a wider distribution. The model shows substantially lower $FID_{2k}$ (at least 2 times better than EG3D and slightly higher than Style-GAN2) and greater NFS on all the datasets. Low NFS indicates flat or repetitive geometry impairing the ability of the model to generate realistic side views. Indeed, both EG3D (with the default camera distribution) and EpiGRAF struggle to generate side views, while 3DGP renders realistic side views on all three datasets.

Table 1 below provides comparisons on SDIP Dogs$_{40k}$, SDIP Elephants, and LSUN Horses$_{40k}$ for EG3D (with the standard and the wider camera range), EpiGRAF, and 3DGP (Table 1A). For completeness, a 2D baseline StyleGAN2 (with KD) is also provided. Table 1B includes the ablations of the proposed contributions including the total training cost.

TABLE 1A

Comparison of EG3D, EpiGRAF and 3DGP

| Model | SDIP Dogs40k | | SDIP Elephants40k | | LSUN Horses40k | | Training cost |
|---|---|---|---|---|---|---|---|
| | FID2k ↓ | NFS ↑ | FID2k ↓ | NFS ↑ | FID2k ↓ | NFS ↑ | (A100 days) |
| EG3D | 16.2 | 11.91 | 4.78 | 2.59 | 3.12 | 13.34 | 3.7 |
| + wide camera | 21.1 | 24.44 | 5.76 | 17.88 | 19.44 | 25.34 | 3.7 |
| EpiGRAF | 25.6 | 3.53 | 8.24 | 12.9 | 6.45 | 9.73 | 2.3 |
| 3DGP | 8.74 | 34.35 | 5.79 | 32.8 | 4.86 | 30.4 | 2.6 |
| StyleGAN2(with KD) | 6.24 | 0.0 | 3.94 | 0.0 | 2.57 | 0.0 | 1.5 |

TABLE 1B

Impact of Adversarial Depth Supervision (ADS)

| 3DGP (w/o ADS, C) | 8.59 | 1.42 | 7.46 | 9.52 | 3.29 | 8.04 | 2.3 |
|---|---|---|---|---|---|---|---|
| + ADS, P(d) = 0.0 | 8.13 | 3.14 | 5.69 | 1.97 | 3.41 | 1.24 | 2.6 |
| + ADS, P($\bar{d}$) = 0.25 | 9.57 | 33.21 | 6.26 | 33.5 | 4.33 | 32.68 | 2.6 |
| + ADS, P($\bar{d}$) = 0.5 | 9.25 | 36.9 | 7.60 | 30.7 | 5.27 | 32.24 | 2.6 |
| + ADS, P($\bar{d}$) = 1.0 | 12.2 | 27.2 | 12.1 | 26.0 | 8.24 | 27.7 | 2.5 |

The proposed Adversarial Depth Supervision (ADS) and the depth adaptor 140 are evaluated where the only hyperparameter is the probability of using the non-adapted depth P(d). This ADS parameter is ablated in Table 1B. While FID scores are slightly affected by varying P(d), substantial difference in the Non-Flatness Score are noted. It is first verified that NFS is the worst without ADS, indicating the lack of a 3D bias. When P(d)=0, the discriminator 150 is not presented with the rendered depth d, while the adaptor learns to fake the depth, leading to flat geometry. When P(d)=1, the depth adaptor 140 is not used, allowing the discriminator 150 to easily determine the generated depth from the estimated depth, as there is a large domain gap (see FIG. 3), leading to reduced FID scores. The best overall geometry and side views are obtained when P(d)=0.5.

Knowledge distillation provides an additional stability for adversarial training, along with the significant improvement in FID, which can be observed by comparing results of EpiGRAF in Table 1A and Bare 3DGP in Table 1B. However, distillation strategies that utilize additional classification networks may provide a significant boost to FID, without corresponding improvement in visual quality.

Figure 7:
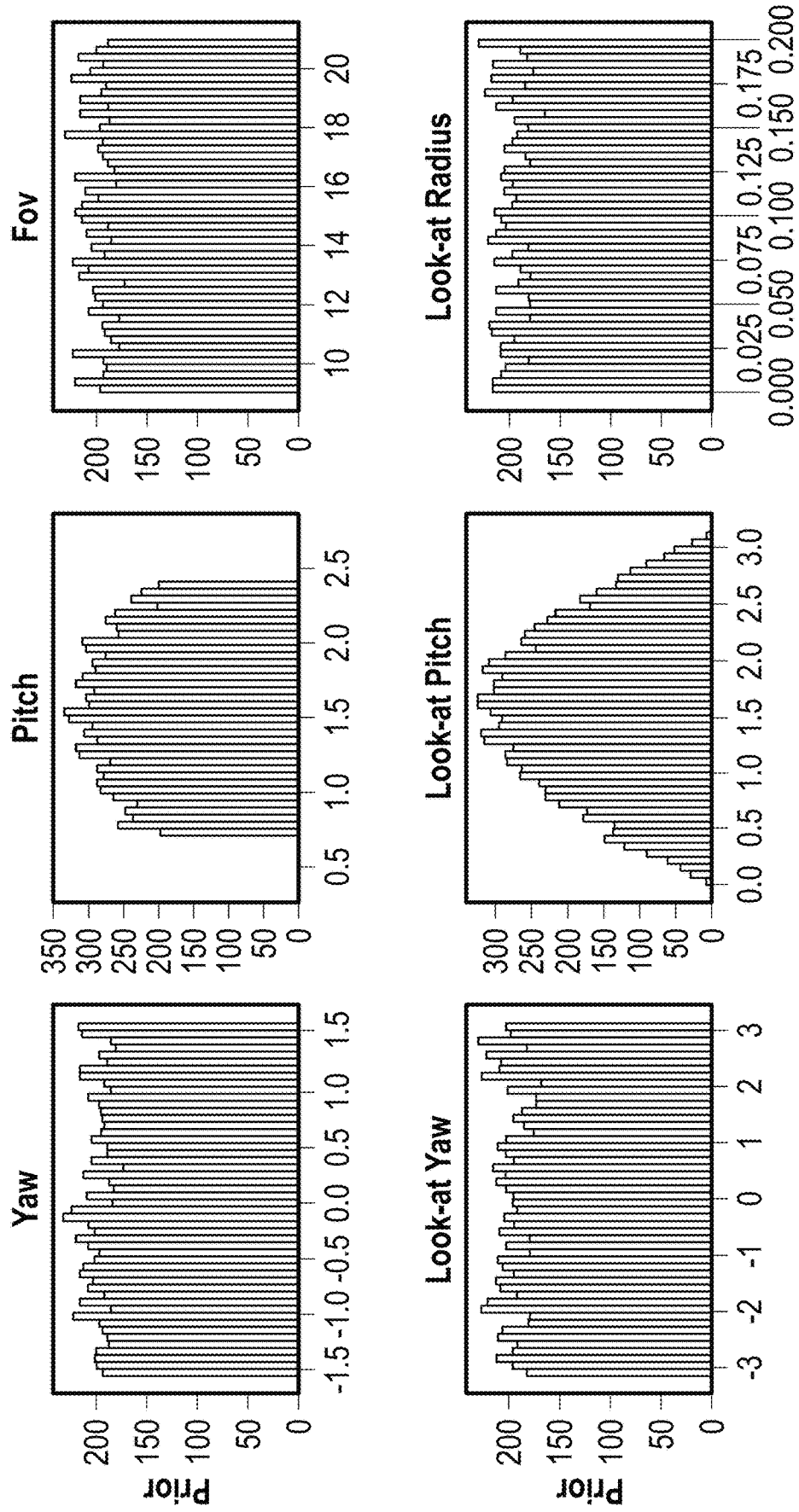
FIG. 7 illustrates plots depicting different strategies for learning the camera distribution in a sample configuration.
Figure 7:
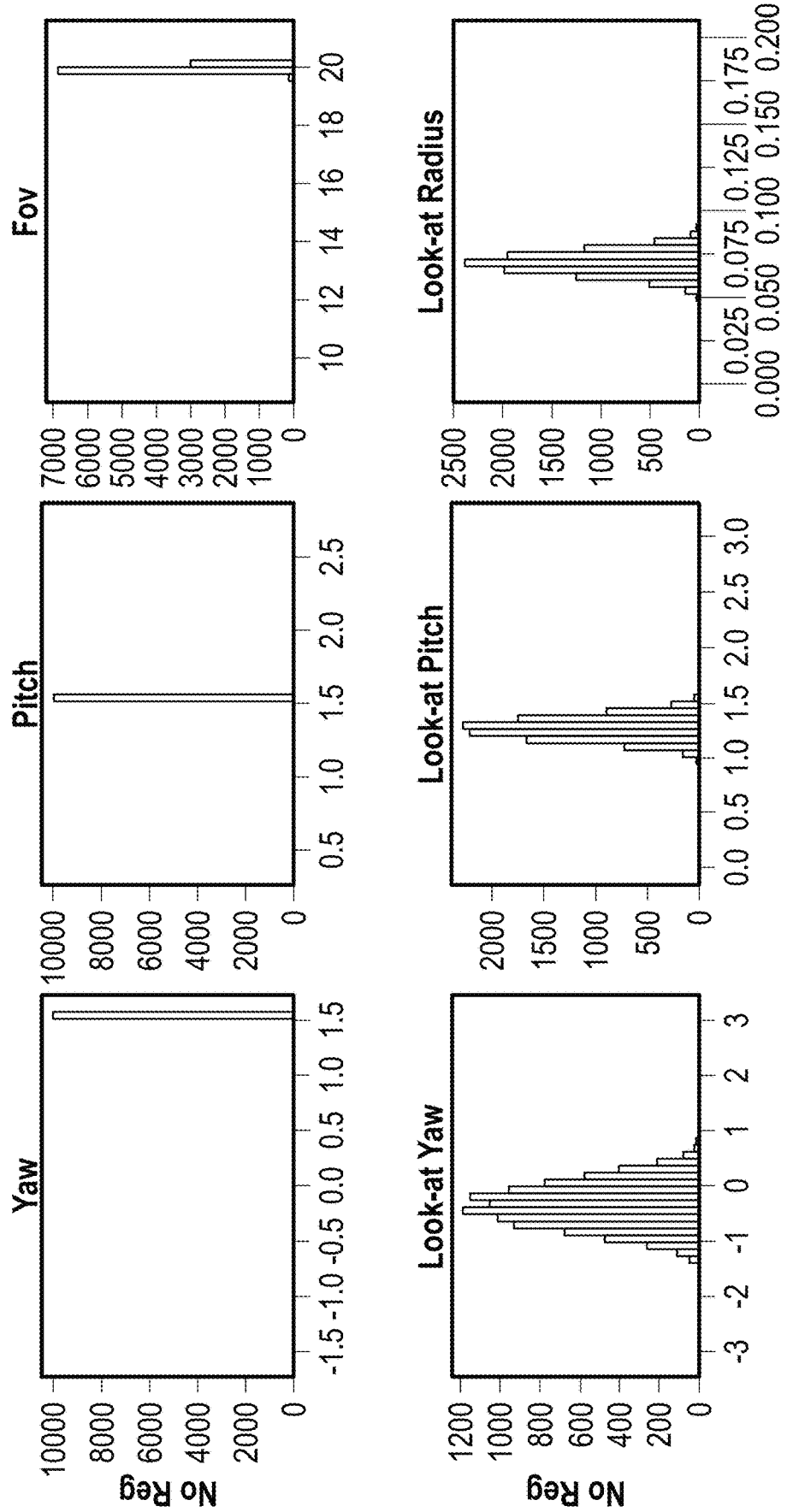
Figure 7:
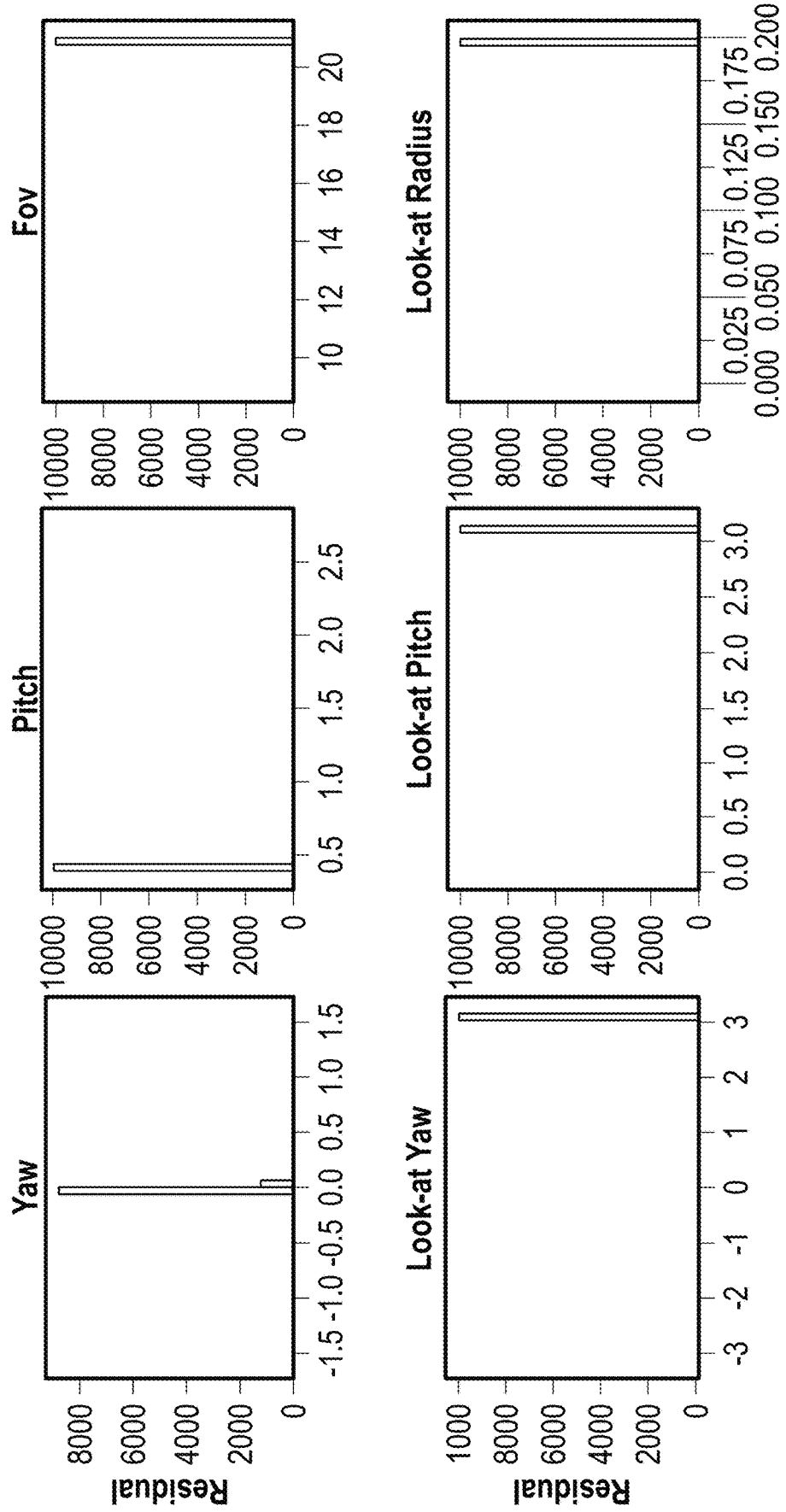
Figure 7:
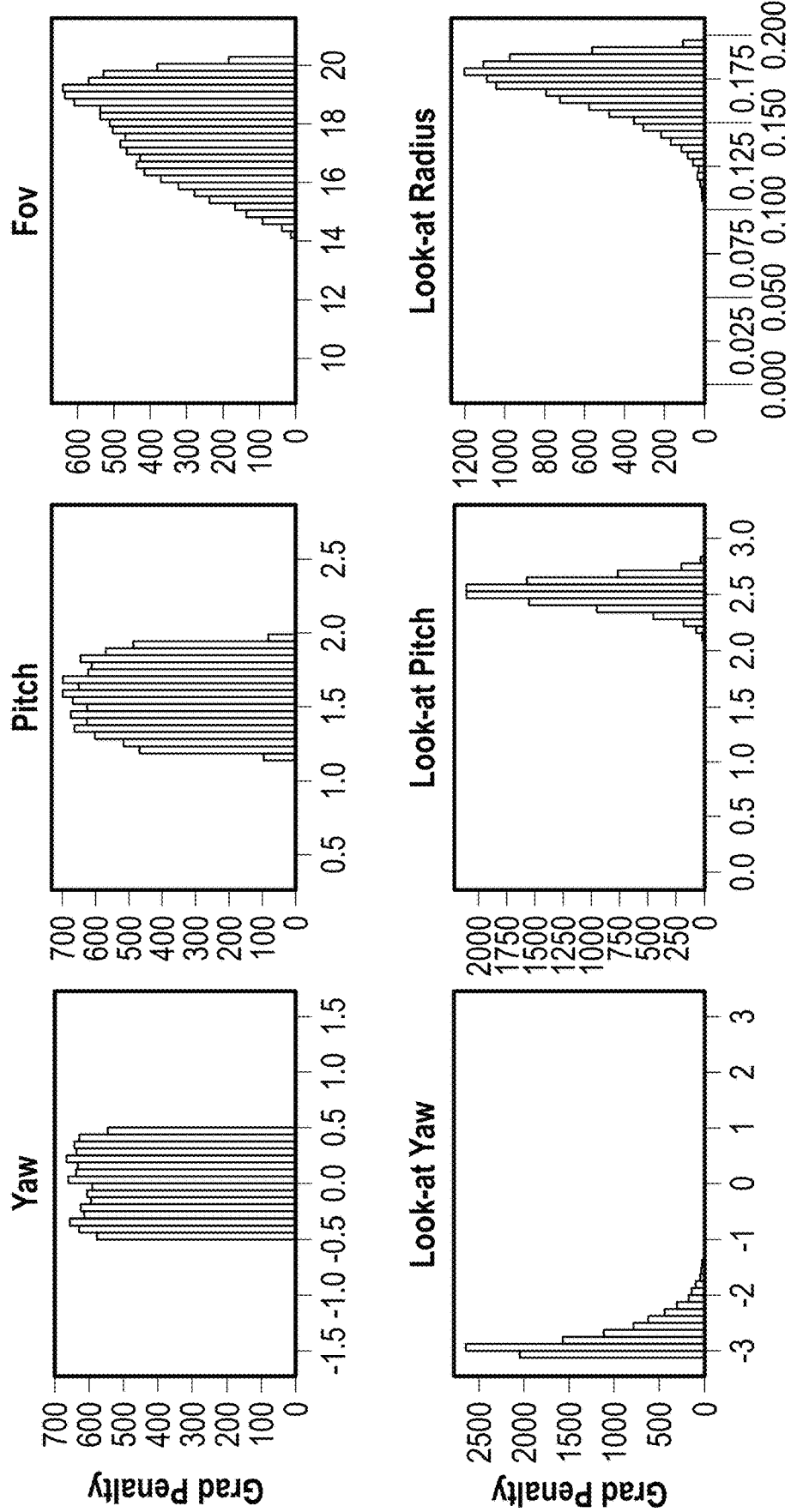

If the learnable camera distribution model is sampled from a narrow distribution, the discriminator 150 will not be presented with side views during training, leading to flat geometry. On the other hand, if the camera distribution is too wide and covers more views than it is available in the dataset, the discriminator 150 will easily win, leading to collapsed training. The proposed "Ball-in-Sphere" model strikes a balance between the two extremes. Different strategies for learning the camera distribution are illustrated in FIG. 7, including sampling the camera φ from the prior φ' without learning, predicting residuals φ–φ', and using the proposed camera generator 110 with Camera Gradient Penalty. FIG. 7 provides comparisons of regularization strategies for the camera distribution. Generic and wide priors are selected for each of the 6 DoFs of the camera model (top row). Without any regularization (no reg) or with the residual-based model (residual), the camera generator 110 collapses to highly concentrated (collapsed) distributions as shown in the second and third rows. In contrast, the proposed regularization (grad penalty) described herein leads to a wider posterior (last row). For the first two cases, the learned distributions are highly concentrated around flat. In contrast, the Camera Gradient Penalty in the bottom row of FIG. 7 provides sufficient regularization to the camera generator 110, enabling it to converge to a sufficiently wide posterior, resulting into valid geometry and realistic side views.

ImageNet is significantly more difficult than single category datasets. Class labels c are used as an additional guidance for the generator 120. The baselines are modified accordingly. The quantitative results of ImageNet experiments are presented in Table 2. For reference, the results of 2D generators, such as GAN-based methods of BigGAN and StyleGAN-XL and a diffusion-based approach of ADM are also reported. As expected, 2D generators show superior FID and Inception Score (IS) compared to the 3D counterparts as the latter use their capacity to learn geometric details. As discussed above, the "wideness" of the camera distribution is a factor to consider, hence, for fair comparisons, the standard camera ranges are reported as well as wide ones. Both EG3D and EpiGRAF produced flat or repetitive geometry, confirming similar experiments on single category articulated datasets. On the other hand, 3DGP produced geometry with rich details.

Table 2 provides a comparison on ImageNet 256. The first three rows show 2D methods, while the next four rows illustrate 3D baselines with narrow and wide camera distribution. The last row provides scores for 3DGP. The last column is the training cost in A100 days.

TABLE 2

| Method | FID ↓ | IS ↑ | NFS ↑ | A100 days ↓ |
|---|---|---|---|---|
| BigGAN | 8.7 | 142.3 | 0.0 | 60 |
| StyleGAN-XL | 2.30 | 265.1 | 0.0 | 163+ |
| ADM | 4.59 | 186.7 | 0.0 | 458 |
| EG3D | 26.7 | 61.4 | 3.70 | 18.7 |
| +wide camera | 25.6 | 57.3 | 9.83 | 18.7 |
| EpiGRAF | 47.56 | 26.68 | 3.93 | 15.9 |
| 3DGP | 26.47 | 73.09 | 27.52 | 28.2 |

3DGP as described herein thus provides a 3D GAN that is scalable to in-the-wild multi-category data such as ImageNet. Generic priors are utilized in the form of monocular depth and latent feature representation to improve the visual quality and to learn geometry. A "Ball-in-Sphere" camera parameterization and a regularization term (NFS) enable learning of meaningful camera distributions. It will be appreciated that 3DGP may be scaled to even larger datasets, which may further improve the discovery of meaningful geometry. Such scaling could be achieved by conditioning 3D generation on natural language.

Figure 8:
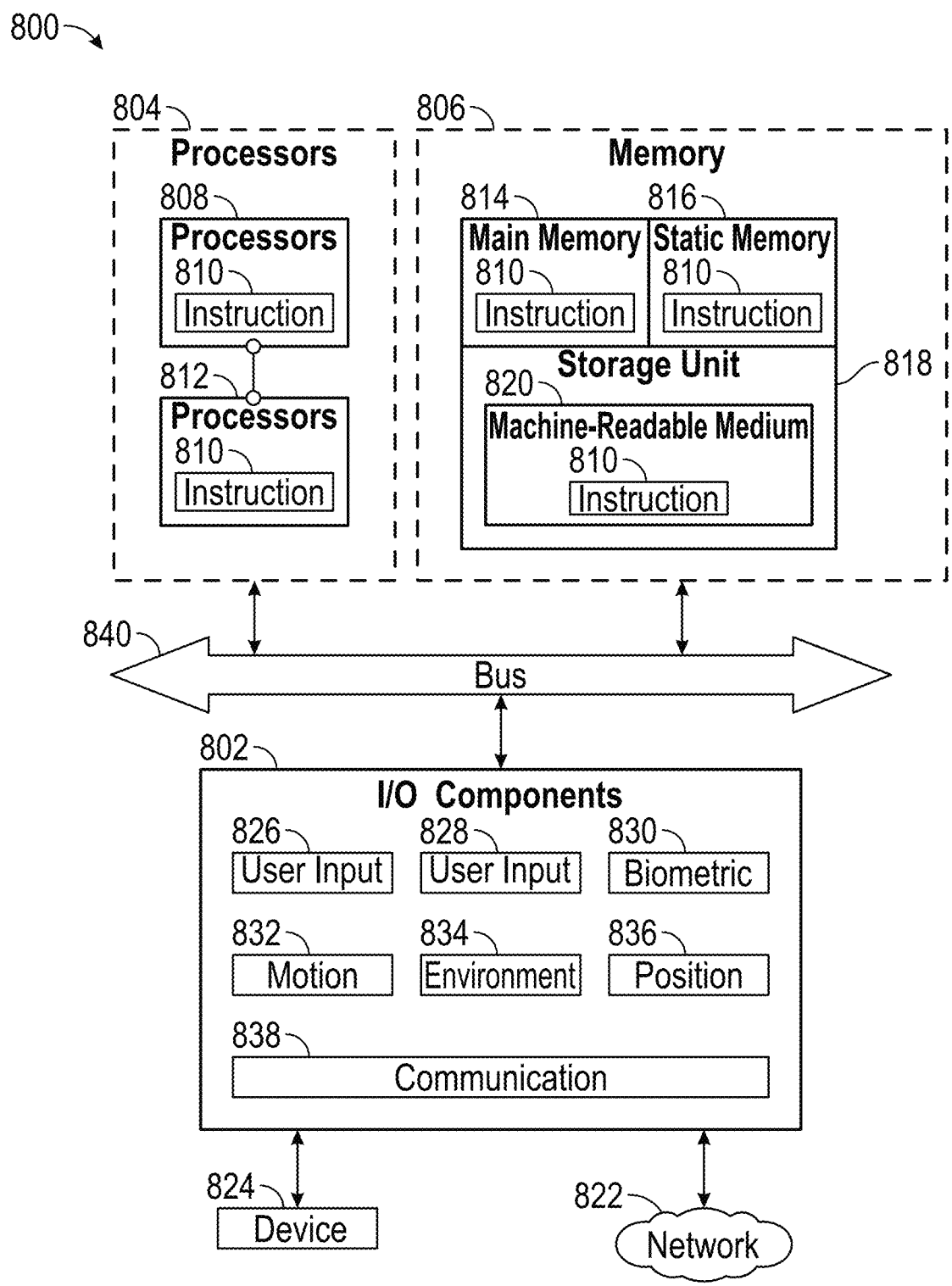
FIG. 8 is a block diagram of a machine within which instructions (e.g., software, a program, an application, an applet, an app, or other executable code) for causing the machine to perform any one or more of the methodologies discussed herein may be executed.

FIG. 8 is a diagrammatic representation of the machine 800 within which instructions 810 (e.g., software, a program, an application, an applet, an app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the 3D generic prior system of FIG. 1. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 806, the static memory 816, and storage unit 818 store the instructions 810 for any one or more of the methodologies or functions described herein. The instructions 810 may also reside, completely or partially, within the main memory 814, within the static memory 816, within machine-readable medium 820 within the storage unit 818, within at least one of the processors 804 (e.g., within the Processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface Component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Figure 9:
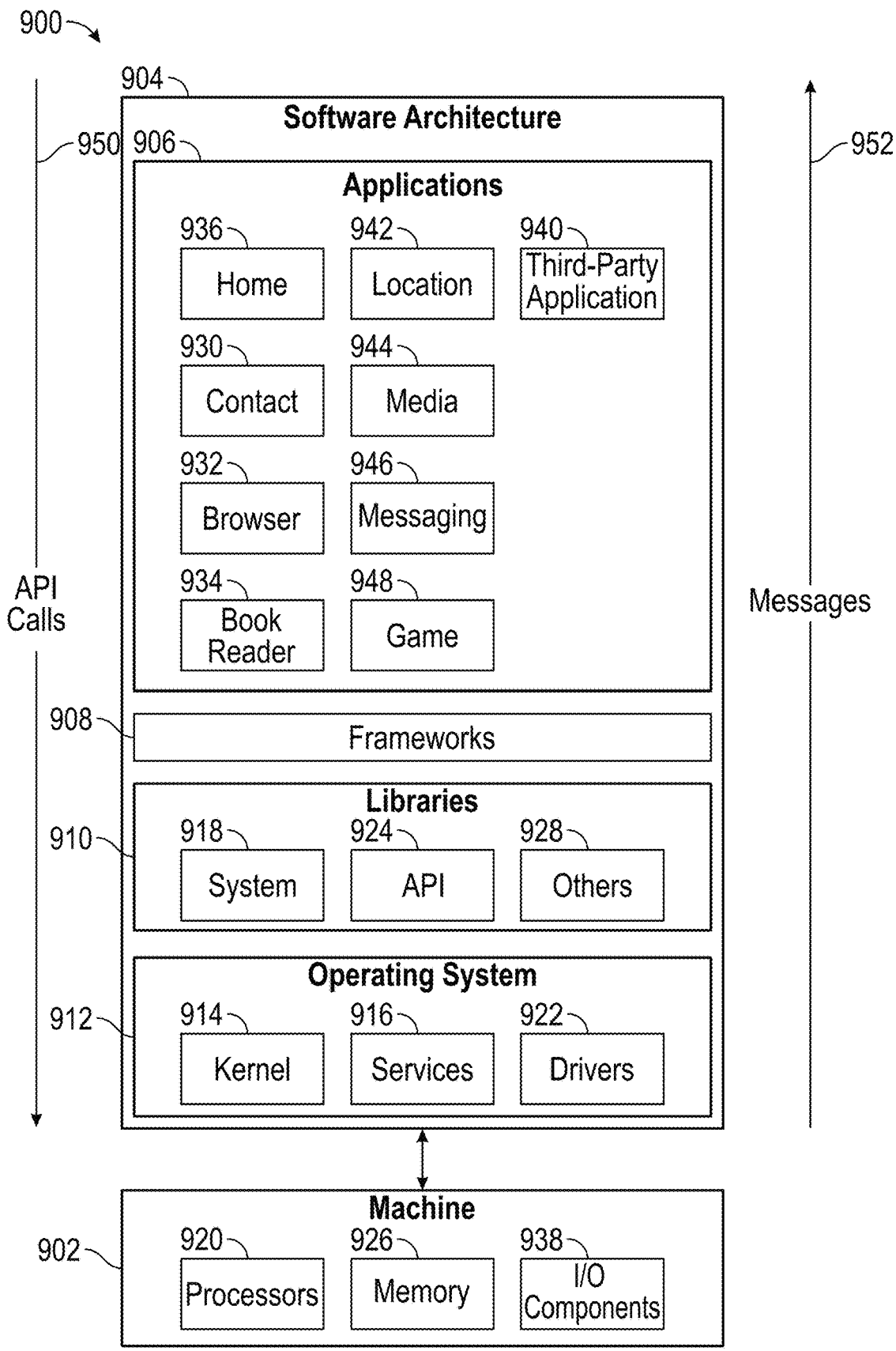
FIG. 9 is a block diagram showing a software architecture within which examples described herein may be implemented.

FIG. 9 is a block diagram 900 illustrating a software architecture 904, which can be installed on any one or more of the devices described herein. The software architecture 904 is supported by hardware such as a machine 902 (see FIG. 8) that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to generate one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, Ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of generating a three-dimensional (3D) object or scene from non-aligned generic camera priors, the method comprising:

producing, by a 3D scene generator, a tri-plane representation for an input scene received in random latent code;

obtaining, by a camera generator, a camera posterior including posterior parameters representing color and density data from the random latent code and from generic camera priors without alignment assumptions of the generic camera priors;

volumetrically rendering, by a volume renderer, an image of the input scene from the color and density data to provide a scene having pixel colors and depth values from an arbitrary camera viewpoint;

processing, by a depth adaptor, the depth values to generate an adapted depth map that bridges domains of rendered and estimated depth maps for the image of the input scene;

providing the adapted depth map and color data to a discriminator;

providing external scene geometry information from an external dataset to the discriminator; and selecting, by the discriminator, a 3D representation of the input scene based on the color data, adapted depth map, and external scene geometry information.

2. The method of claim 1, wherein obtaining color and density data from the random latent code and generic camera priors comprises using a shallow 2-layer multi-layer perceptron (MLP) decoder to sample arbitrary camera viewpoints captured from ball-in-sphere camera parameterizations provided to the camera generator, the ball-in-sphere camera parameterization having four additional degrees of freedom including a field of view and pitch, yaw and radius of an inner sphere specifying a look-at point within an outer sphere of the ball-in-sphere camera parameterizations.

3. The method of claim 1, further comprising learning the arbitrary camera viewpoint during training for each input dataset.

4. The method of claim 1, further comprising pushing derivatives of predicted camera parameters with respect to prior camera parameters to either one or minus one to arrive at a camera gradient penalty $L_{\varphi i}$:

$$\mathcal{L}_{\varphi_i} = \left|\frac{\partial \varphi_i}{\partial \varphi'_i}\right| + \left|\frac{\partial \varphi_i}{\partial \varphi'_i}\right|^{-1},$$

where $\varphi'_i \in \varphi'$ is a camera sampled from a prior camera distribution and $\varphi_i \in \varphi$ is produced by the camera generator.

5. The method of claim 1, wherein volumetrically rendering the image of the input scene from the color and density data comprises rendering depths d by volumetric rendering as follows:

$$d = \int_{t_n}^{t_f} T(t)\sigma(r(t))tdt,$$

where $t_n$ and $t_f$ are near/far planes, T(t) is accumulated transmittance, and r(t) is a ray.

6. The method of claim 5, wherein volumetrically rendering the image of the input scene from the color and density data further comprises shifting and scaling a depth d from a range of $[t_n, t_f]$ into $[-1, 1]$ to obtain normalized depth $\bar{d}$:

$$\bar{d} = 2 \cdot \frac{d - (t_n + t_f + b)/2}{t_f - t_n - b},$$

where $b \in [0, (t_n+t_f)/2]$ is an additional learnable shift that accounts for empty space in front of a camera.

7. The method of claim 1, wherein processing the depth values comprises producing the adapted depth map as a function of a normalized depth where the depth values are concatenated with RGB color data input and passed to the discriminator.

8. The method of claim 7, wherein processing the depth values comprises using a convolutional network to generate separate depth maps with different levels of adaptation and the adapted depth map is randomly selected from the separate depth maps.

9. A system for generating a three-dimensional (3D) object or scene from non-aligned generic camera priors, comprising:

a 3D scene generator that produces a tri-plane representation for an input scene received in random latent code;

a camera generator that obtains a camera posterior including posterior parameters representing color and density data from the random latent code and from generic camera priors without alignment assumptions of the generic camera priors;

a volume renderer that volumetrically renders an image of the input scene from the color and density data to provide a scene having pixel colors and depth values from an arbitrary camera viewpoint;

a depth adaptor that processes the depth values to generate an adapted depth map that bridges domains of rendered and estimated depth maps for the image of the input scene; and a discriminator that receives the adapted depth map, color data and external scene geometry information from an external dataset and selects a 3D representation of the input scene based on the color data, adapted depth map, and external scene geometry information.

10. The system of claim 9, wherein the 3D scene generator comprises a mapping network, a synthesis network, and a tri-plane decoder.

11. The system of claim 10, wherein the mapping network takes noise $z \in \mathbb{R}^{512}$ and class label $c \in 0, \ldots, K-1$, where K is a number of classes and produces a style code $w \in \mathbb{R}^{512}$, the mapping network comprising a 2-layer multi-layer perceptron (MLP) network with Leaky rectified linear unit (Leaky-ReLU) activations and 512 neurons in each layer.

12. The system of claim 10, wherein the synthesis network comprises a decoder network that produces tri-plane features $p=(p^{xy}, p^{yz}, p^{xz}) \in \mathbb{R}^{3\times(512\times512\times32)}$ wherein a feature vector $f_{xyz} \in \mathbb{R}^{32}$ located $(x, y, z) \in \mathbb{R}^3$ is computed by projecting a coordinate back to the tri-plane representation, followed by bi-linearly interpolating nearby features and averaging features from different planes.

13. The system of claim 10, wherein the tri-plane decoder comprises a two-layer multi-layer perceptron (MLP) network with Leaky-ReLU activations in a hidden layer that takes a tri-plane feature $f_{xyz}$ point as input and produces the color and density data in the tri-plane feature $f_{xyz}$ point.

14. The system of claim 9, wherein the camera generator includes a learning system to adjust learnable posterior camera parameters and to provide six degrees of freedom to the learnable posterior camera parameters.

15. The system of claim 9, wherein the camera generator avoids posterior collapse by reducing a Lipschitz constant for the camera generator.

16. The system of claim 9, wherein the depth adaptor comprises a three layer convolutional neural network and a shared convolutional layer that converts outputs of the convolutional neural network into respective depth maps.

17. The system of claim 16, wherein the depth adaptor normalizes an input depth image and applies the normalized input depth image to convolutional layers of the convolutional neural network to generate the respective depth maps obtained from different convolutional layers of the convolutional neural network and randomly selects one of the generated respective depth maps as the adapted depth map.

18. The system of claim 9, wherein the discriminator receives distilled knowledge about the external scene geometry from a pretrained image source and a 3D representation of the input image from the depth adaptor.

19. The system of claim 9, wherein the camera generator is conditioned on class labels of the input scene when generating a camera position and on random scene data when generating a look-at position and field-of-view.

20. A non-transitory computer-readable storage medium, the computer-readable storage medium including instructions that when executed by a processor cause the processor to generate a three-dimensional (3D) object or scene from non-aligned generic camera priors by performing operations comprising:
- producing a tri-plane representation for an input scene received in random latent code;
- obtaining a camera posterior including posterior parameters representing color and density data from the random latent code and from generic camera priors without alignment assumptions of the generic camera priors;
- volumetrically rendering an image of the input scene from the color and density data to provide a scene having pixel colors and depth values from an arbitrary camera viewpoint;
- processing the depth values to generate an adapted depth map that bridges domains of rendered and estimated depth maps for the image of the input scene; and
- selecting a 3D representation of the input scene based on the color data, adapted depth map, and external scene geometry information from an external dataset.

* * * * *